(12) United States Patent
Yano

(10) Patent No.: US 12,160,552 B2
(45) Date of Patent: Dec. 3, 2024

(54) MANAGEMENT OF SHEETS IN MULTIPLE IMAGE FORMING APPARATUSES

(71) Applicant: CANON KABUSHIKI KAISHA, Tokyo (JP)

(72) Inventor: Takaaki Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/344,243

(22) Filed: Jun. 29, 2023

(65) Prior Publication Data

US 2024/0007572 A1 Jan. 4, 2024

(30) Foreign Application Priority Data

Jun. 30, 2022 (JP) ................................. 2022-105517

(51) Int. Cl.
*H04N 1/00* (2006.01)
*G06F 3/0486* (2013.01)

(52) U.S. Cl.
CPC ....... *H04N 1/00482* (2013.01); *G06F 3/0486* (2013.01); *H04N 1/0044* (2013.01)

(58) Field of Classification Search
None
See application file for complete search history.

(56) References Cited

U.S. PATENT DOCUMENTS

| | | |
|---|---|---|
| 2008/0022221 A1* | 1/2008 | Sano ............... G06F 3/1205 715/771 |
| 2008/0085133 A1 | 4/2008 | Ishii |
| 2010/0188700 A1 | 7/2010 | Fujimori |
| 2018/0152572 A1 | 5/2018 | Yano |
| 2020/0033781 A1 | 1/2020 | Igarashi |
| 2020/0272372 A1 | 8/2020 | Yada |

FOREIGN PATENT DOCUMENTS

| | | |
|---|---|---|
| EP | 1639414 A1 | 3/2006 |
| EP | 2701054 A2 | 2/2014 |
| JP | 2000181641 A | 6/2000 |
| JP | 2010064383 A | 3/2010 |
| JP | 2018-086766 A | 6/2018 |

* cited by examiner

*Primary Examiner* — Lennin R RodriguezGonzalez
(74) *Attorney, Agent, or Firm* — Canon U.S.A., Inc. IP Division

(57) ABSTRACT

A computer-readable storage medium storing a program for causing a computer to execute a control method of an information processing apparatus includes acquiring first sheet information registered in a first sheet storage unit of a first image forming apparatus and second sheet information registered in a second sheet storage unit of a second image forming apparatus, and displaying, on a display unit in an identifiable manner, that the first sheet information acquired is sheet information registered in the first sheet storage unit and that the second sheet information acquired is sheet information registered in the second sheet storage unit.

19 Claims, 16 Drawing Sheets

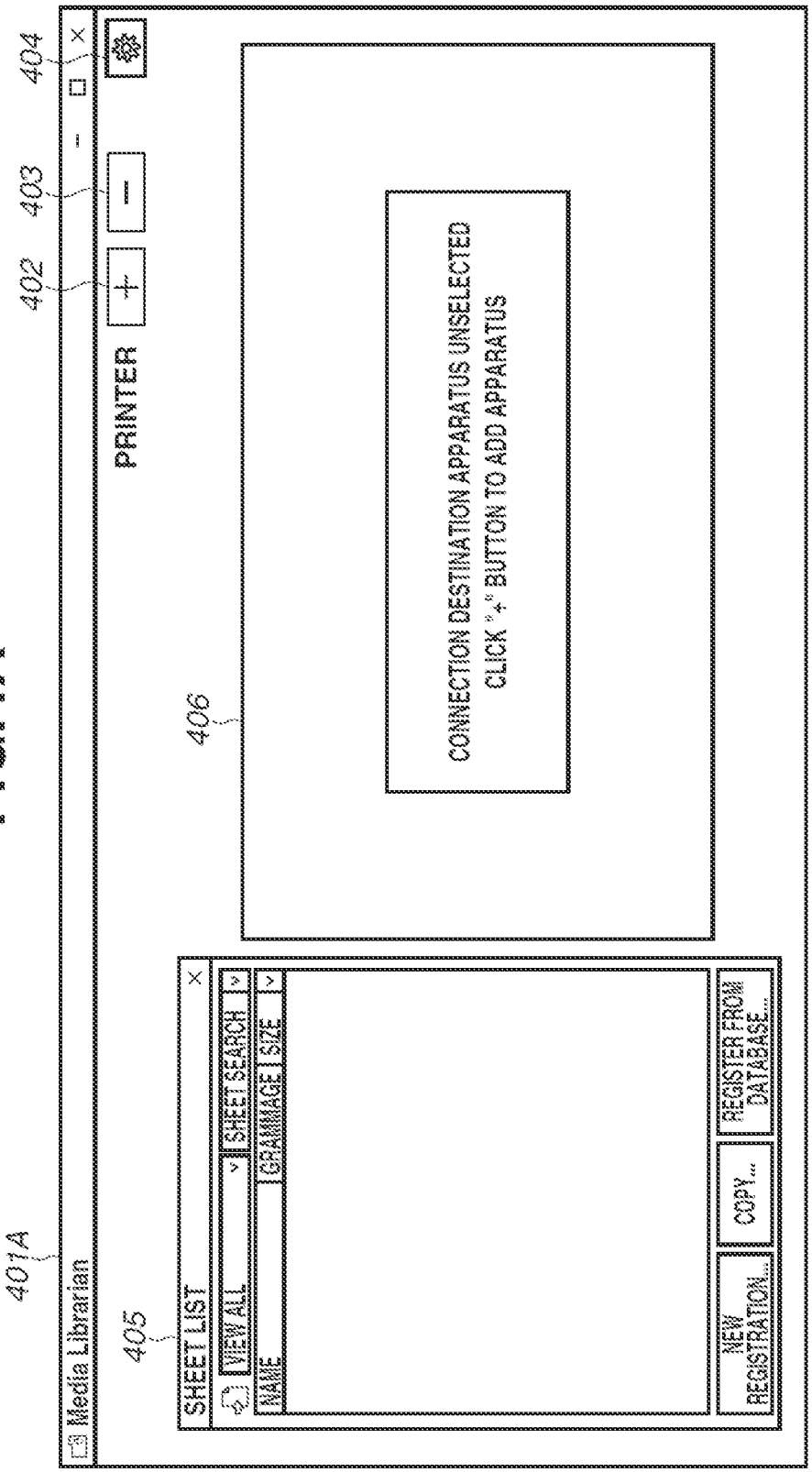

FIG.11A

| SHEET | | | | SHEET FEEDING TRAY | | | | |
|---|---|---|---|---|---|---|---|---|
| TYPE | SIZE | GRAMMAGE | SURFACE PROPERTY | TRAY 1 | TRAY 2 | TRAY 3 | TRAY 4 | TRAY 5 |
| PLAIN PAPER | A5 | 60 – 120 | UNCOATED | ○ | ○ | ○ | ○ | ○ |
| | B5 | | | ○ | ○ | ○ | ○ | ○ |
| | A4 | | | ○ | ○ | ○ | ○ | ○ |
| | B4 | | | ○ | ○ | ○ | ○ | ○ |
| | A3 | | | ○ | ○ | × | ○ | ○ |
| | B3 | | | ○ | ○ | × | ○ | ○ |
| THICK PAPER | A5 | 121 – 200 | UNCOATED | ○ | ○ | ○ | ○ | ○ |
| | B5 | | | ○ | ○ | ○ | ○ | ○ |
| | A4 | | | ○ | ○ | ○ | ○ | ○ |
| | B4 | | | ○ | ○ | ○ | ○ | ○ |
| | A3 | | | ○ | ○ | × | ○ | ○ |
| | B3 | | | ○ | ○ | × | ○ | ○ |
| THICKEST PAPER | A5 | 201 – 250 | UNCOATED | × | × | × | ○ | ○ |
| | B5 | | | × | × | × | ○ | ○ |
| | A4 | | | × | × | × | ○ | ○ |
| | B4 | | | × | × | × | ○ | ○ |
| | A3 | | | × | × | × | ○ | ○ |
| | B3 | | | × | × | × | ○ | ○ |
| BOTH SIDES COATED PAPER | A5 | 60 – 180 | COATED | × | × | ○ | ○ | ○ |
| | B5 | | | × | × | ○ | ○ | ○ |
| | A4 | | | × | × | ○ | ○ | ○ |
| | B4 | | | × | × | ○ | ○ | ○ |
| | A3 | | | × | × | × | ○ | ○ |
| | B3 | | | × | × | × | ○ | ○ |
| ... | ... | ... | ... | ... | ... | ... | ... | ... |
| ... | ... | ... | ... | ... | ... | ... | ... | ... |

FIG.11B

| SHEET ID | NAME | TYPE | SIZE | GRAMMAGE | SURFACE PROPERTY | ADJUSTMENT PARAMETER |
|---|---|---|---|---|---|---|
| M001 | NORMAL A | PLAIN PAPER | A4 | 100 | UNCOATED | [IMAGE POSITION ADJUSTMENT], [SECONDARY TRANSFER VOLTAGE]... |
| M002 | NORMAL B | PLAIN PAPER | A4 | 120 | UNCOATED | [IMAGE POSITION ADJUSTMENT], [SECONDARY TRANSFER VOLTAGE]... |
| M003 | C MEDIA | THICK PAPER | A3 | 150 | UNCOATED | [IMAGE POSITION ADJUSTMENT], [SECONDARY TRANSFER VOLTAGE]... |
| M004 | PAPER D | THICK PAPER | A4 | 198 | UNCOATED | [IMAGE POSITION ADJUSTMENT], [SECONDARY TRANSFER VOLTAGE]... |
| M005 | THICK PAPER E | THICKEST PAPER | B3 | 250 | UNCOATED | [IMAGE POSITION ADJUSTMENT], [SECONDARY TRANSFER VOLTAGE]... |
| M006 | RICH COATED PAPER F | BOTH SIDES COATED PAPER | A3 | 120 | COATED | [IMAGE POSITION ADJUSTMENT], [SECONDARY TRANSFER VOLTAGE]... |
| M007 | ULTRA COATED PAPER G | BOTH SIDES COATED PAPER | A3 | 160 | COATED | [IMAGE POSITION ADJUSTMENT], [SECONDARY TRANSFER VOLTAGE]... |
| ... | ... | ... | ... | ... | ... | ... |
| ... | ... | ... | ... | ... | ... | ... |

FIG.11C

| TRAY NO. | SHEET ID | NAME | TYPE | SIZE | GRAMMAGE | SURFACE PROPERTY | ADJUSTMENT PARAMETER |
|---|---|---|---|---|---|---|---|
| 1 | M001 | NORMAL A | PLAIN PAPER | A4 | 100 | UNCOATED | [IMAGE POSITION ADJUSTMENT], [SECONDARY TRANSFER VOLTAGE]... |
| 2 | M004 | PAPER D | THICK PAPER | A4 | 198 | UNCOATED | [IMAGE POSITION ADJUSTMENT], [SECONDARY TRANSFER VOLTAGE]... |
| 3 | M002 | NORMAL B | PLAIN PAPER | A4 | 120 | UNCOATED | [IMAGE POSITION ADJUSTMENT], [SECONDARY TRANSFER VOLTAGE]... |
| 4 | M007 | ULTRA COATED PAPER G | BOTH SIDES COATED PAPER | A3 | 160 | COATED | [IMAGE POSITION ADJUSTMENT], [SECONDARY TRANSFER VOLTAGE]... |
| 5 | M006 | RICH COATED PAPER F | BOTH SIDES COATED PAPER | A3 | 120 | COATED | [IMAGE POSITION ADJUSTMENT], [SECONDARY TRANSFER VOLTAGE]... |

SHEET COPY SETTING

SHEET TO BE REGISTERED DOES NOT EXIST IN THIS APPARATUS.
NEW SHEET SETTING WILL BE CREATED.
SELECT ATTRIBUTE TO BE COPIED AND PRESS OK BUTTON.

- ● ONLY BASIC ATTRIBUTES —1202
- ○ ALL ATTRIBUTES —1203
- ○ SELECT DETAILS (OPEN SELECTION SCREEN) —1204

SELECT DETAILS

SELECT ATTRIBUTE TO BE COPIED.
BASIC ATTRIBUTES ARE ALWAYS SELECTED.

| 1212 | 1213 |
|---|---|
| ✓ | NAME |
| ✓ | TYPE |
| ✓ | SIZE |
| ✓ | GRAMMAGE |
| ✓ | SURFACE PROPERTY |
|   | IMAGE POSITION ADJUSTMENT PARAMETER |
| ✓ | SECONDARY TRANSFER VOLTAGE PARAMETER |
|   | CURL CORRECTION AMOUNT PARAMETER |

1214 OK

MANAGEMENT OF SHEETS IN MULTIPLE IMAGE FORMING APPARATUSES

BACKGROUND OF THE INVENTION

Field of the Invention

The present invention relates to a computer-readable storage medium, an information processing apparatus, and a control method for controlling an information processing apparatus.

Description of the Related Art

An image forming apparatus including a plurality of sheet feeding trays (e.g., sheet feed cassette, manual feeding tray, inserter) has been conventionally used. By setting sheet information in a sheet feeding tray of the image forming apparatus on an operation panel of the image forming apparatus, and setting sheets conforming to the sheet information, into the sheet feeding tray, an operator can execute printing onto a desired sheet.

Especially for an image forming apparatus in which various types of sheets are settable in a plurality of sheet feeding trays, a sheet management application aimed at a sheet management setting exists, and a structure for improving the operability of a user has been considered.

Japanese Patent Application Laid-Open No. 2018-86766 discusses a system to make a sheet setting in a desired sheet feeding tray of one image forming apparatus connected through a sheet management application, by a simple operation based on a sheet list in the sheet management application.

In some environments, a plurality of image forming apparatuses are installed and an operator manages the plurality of image forming apparatuses. In such environments, further improvement in user operability is expected if the type of sheets stored in each sheet feeding tray of the plurality of image forming apparatuses are to be easily identified.

Nevertheless, Japanese Patent Application Laid-Open No. 2018-86766 discusses a configuration of managing sheet information of one image forming apparatus, and does not discuss sheet management for a plurality of apparatuses. To perform sheet management for a plurality of image forming apparatuses, it is desired to share sheet list information and setting information of sheet feeding trays that are stored as information unique to each of the image forming apparatuses. However, the technique discussed in Japanese Patent Application Laid-Open No. 2018-86766 does not satisfy such a function.

SUMMARY OF THE INVENTION

According to an aspect of the present invention, a computer-readable storage medium storing a program for causing a computer to execute a control method of an information processing apparatus includes acquiring first sheet information registered in a first sheet storage unit of a first image forming apparatus and second sheet information registered in a second sheet storage unit of a second image forming apparatus, and displaying, on a display unit in an identifiable manner, that the first sheet information acquired in the acquiring is sheet information registered in the first sheet storage unit and that the second sheet information acquired in the acquiring is sheet information registered in the second sheet storage unit.

Further features of the present invention will become apparent from the following description of embodiments with reference to the attached drawings.

BRIEF DESCRIPTION OF THE DRAWINGS

FIGS. 4A, 4B, and 4C are diagrams each illustrating an example of a home screen of a sheet management application according to the first embodiment.

FIGS. 11A, 11B, and 11C are diagrams illustrating an example of sheet feeding tray setting information and sheet list information according to the first embodiment.

FIGS. 12A and 12B are diagrams illustrating an example of a sheet copy setting screen according to a second embodiment that is to be displayed when sheet information is updated.

DESCRIPTION OF THE EMBODIMENTS

Hereinafter, embodiments of the present invention will be described in detail with reference to the drawings. The following embodiments are not intended to limit the invention set forth in the appended claims, and not all the combinations of features described in the embodiments are always essential to the solution of the present invention.

Figure 1:
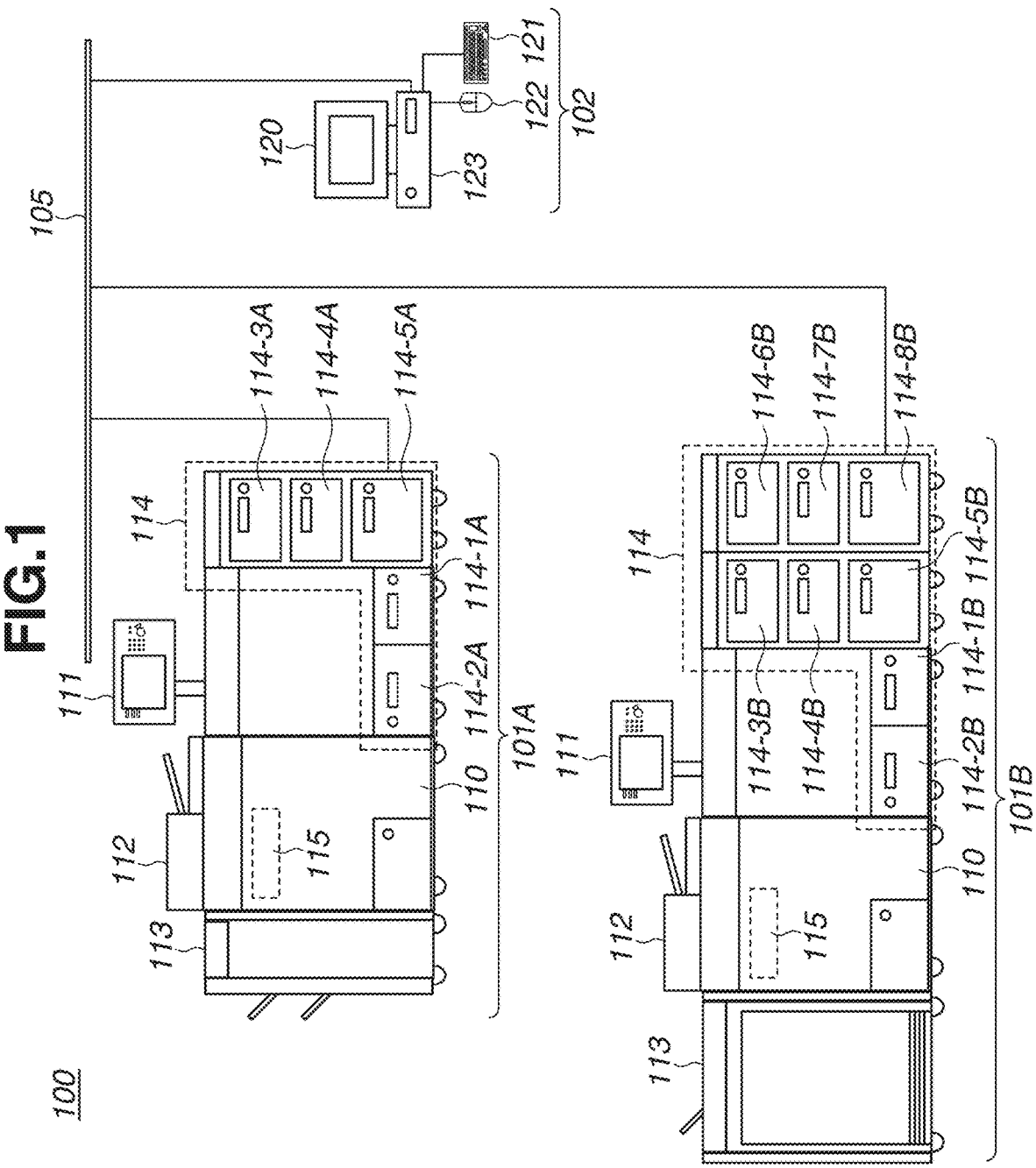
FIG. 1 is a diagram illustrating an overall configuration of a printing management system according to a first embodiment.

FIG. 1 is a diagram illustrating an overall configuration of a sheet management system 100 according to a first embodiment.

The sheet management system 100 includes a plurality of image forming apparatuses (an image forming apparatus 101A and an image forming apparatus 101B each of which sometimes hereinafter referred to as an image forming apparatus 101), and a client computer (personal computer (PC)) 102, which are connected in such a manner that communication can be performed. The client computer 102 serves as an example of an information processing apparatus.

The client computer 102 also serves as an example of an external apparatus because the client computer 102 is an apparatus connected on the outside of the image forming apparatuses.

The image forming apparatus 101 and the client computer 102 are communicably connected via a local area network (LAN) 105 using, for example, an Ethernet® cable.

The image forming apparatus 101 is a multifunction peripheral including various functions. The image forming apparatus 101 can execute printing based on data received from the client computer 102. The image forming apparatus 101 can also make a copy using image data generated by reading a document. The image forming apparatus 101 can also transmit image data generated by reading a document to a shared folder. The image forming apparatus 101 receives an instruction from a sheet management application operating on the client computer 102 and executes necessary processing.

FIG. 1 illustrates a configuration in which two image forming apparatuses 101 (image forming apparatuses 101A and 101B) are connected to the LAN 105, but three or more image forming apparatuses 101 can be connected.

The client computer 102 operates the sheet management system 100 by activating applications in accordance with operations performed by an operator, or issues a printing instruction from a printer driver.

Components assigned the reference numerals from 110 to 115 will be described with reference to FIG. 2.

Components assigned the reference numerals from 120 to 124 will be described with reference to FIG. 3.

Figure 2:
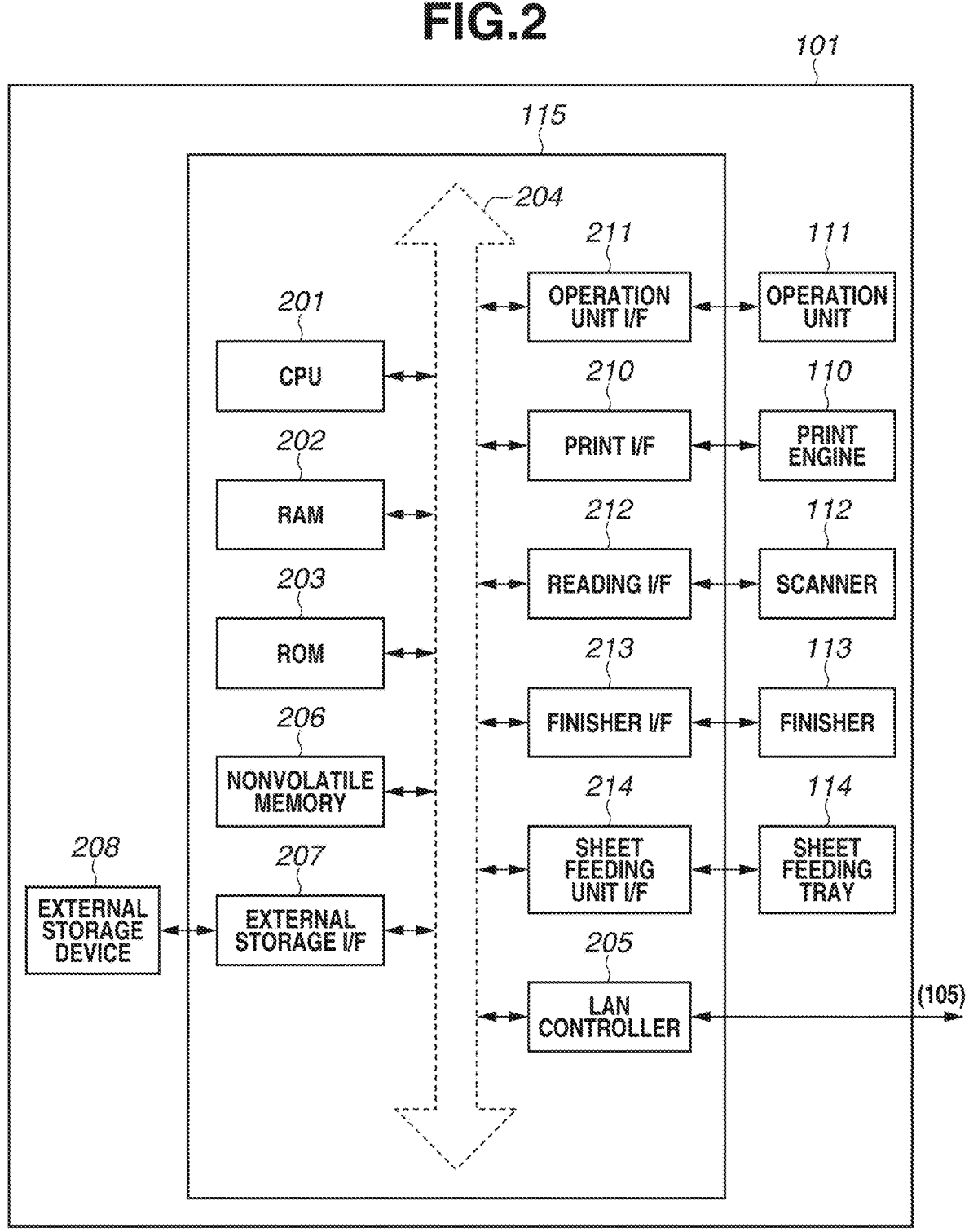
FIG. 2 is a block diagram illustrating a hardware configuration of an image forming apparatus according to the first embodiment.

FIG. 2 is a block diagram illustrating a hardware configuration of the image forming apparatus 101A illustrated in FIG. 1.

The image forming apparatus 101B has almost the same configuration as that of the image forming apparatus 101A except that the type of a finisher 113 is different, and therefore the configurations of the image forming apparatuses 101A and 101B will be collectively described as the configuration of the image forming apparatus 101.

As illustrated in FIG. 2, the image forming apparatus 101 includes an operation unit 111, a print engine 110, a scanner 112, the finisher 113, a sheet feeding tray 114, and a controller 115.

The operation unit 111 is a panel for displaying information to the user and receiving an operation performed by the user. The operation unit 111 includes a display unit, such as a liquid crystal display, and an input unit, such as a touch sensor and hardware keys.

The print engine 110 is an image forming unit for forming an image onto a sheet. The print engine 110 performs printing by forming an image using an electrophotographic method, for example, and heat-fixing a toner image onto a sheet. The print engine 110 can be an engine having another printing mechanism, such as an inkjet printing mechanism.

The scanner 112 is a reading device for reading a document. The document reading is performed on a pressing platen or by an auto document feeder (ADF).

The finisher 113 is a postprocessing device for performing postprocessing on a sheet. The finisher 113 of the image forming apparatus 101A performs, for example, sorting processing, punching processing, or stapling processing, on sheets conveyed from the print engine 110, and discharges the processed sheets to a predetermined location. The finisher 113 of the image forming apparatus 101B performs large-volume stacking processing on sheets conveyed from the print engine 110.

The sheet feeding tray 114 is a sheet storing unit (also referred to as a sheet storage unit) for storing sheets to be used in image formation. Each sheet feeding tray is assigned a number, and information regarding stored sheets is managed using the operation unit 111 and the sheet management application.

In the present embodiment, the image forming apparatus 101A includes, for example, five sheet feeding trays. In this example, reference numerals 114-1A to 114-5A are allocated to the five sheet feeding trays in order and reference numerals 114-1B to 114-8B are allocated to eight sheet feeding trays, for example, in order included with the image forming apparatus 101B.

The controller 115 is a control unit for comprehensively controlling the image forming apparatus 101. The controller 115 includes a central processing unit (CPU) 201, a random access memory (RAM) 202, a read-only memory (ROM) 203, a nonvolatile memory 206, an operation unit interface (I/F) 211, a printing I/F 210, a reading OF 212, a finisher I/F 213, a sheet feeding unit I/F 214, an external storage OF 207, and a LAN controller 205.

The CPU 201 comprehensively controls access to and from various devices connected to a system bus 204 based on a control program stored in the ROM 203 or an external storage device 208. The RAM 202 mainly functions as a main memory of the CPU 201, and functions as a work area of the CPU 201. The I/Fs 207, 210, 211, 212, 213, and 214 enable data input-output to be performed between connected devices and the CPU 201.

The external storage device 208 is a storage unit for storing data. For example, a hard disk drive (HDD) or a solid state drive (SSD) is used as the external storage device 208. The external storage device 208 stores, for example, an application program, font data, and frame data. The external storage device 208 is used as a job storage region for temporarily spooling print jobs, and controlling the spooled jobs from the outside. The external storage device 208 holds image data read from the scanner 112 or image data of print jobs, as hold print data. The external storage device 208 holds various logs, such as job logs and image logs. The nonvolatile memory 206 stores various types of setting information. The LAN controller 205 (LAN I/F) communicates with the client computer 102 or an external system via the LAN 105, and transmits and receives control commands and print data.

Figure 3:
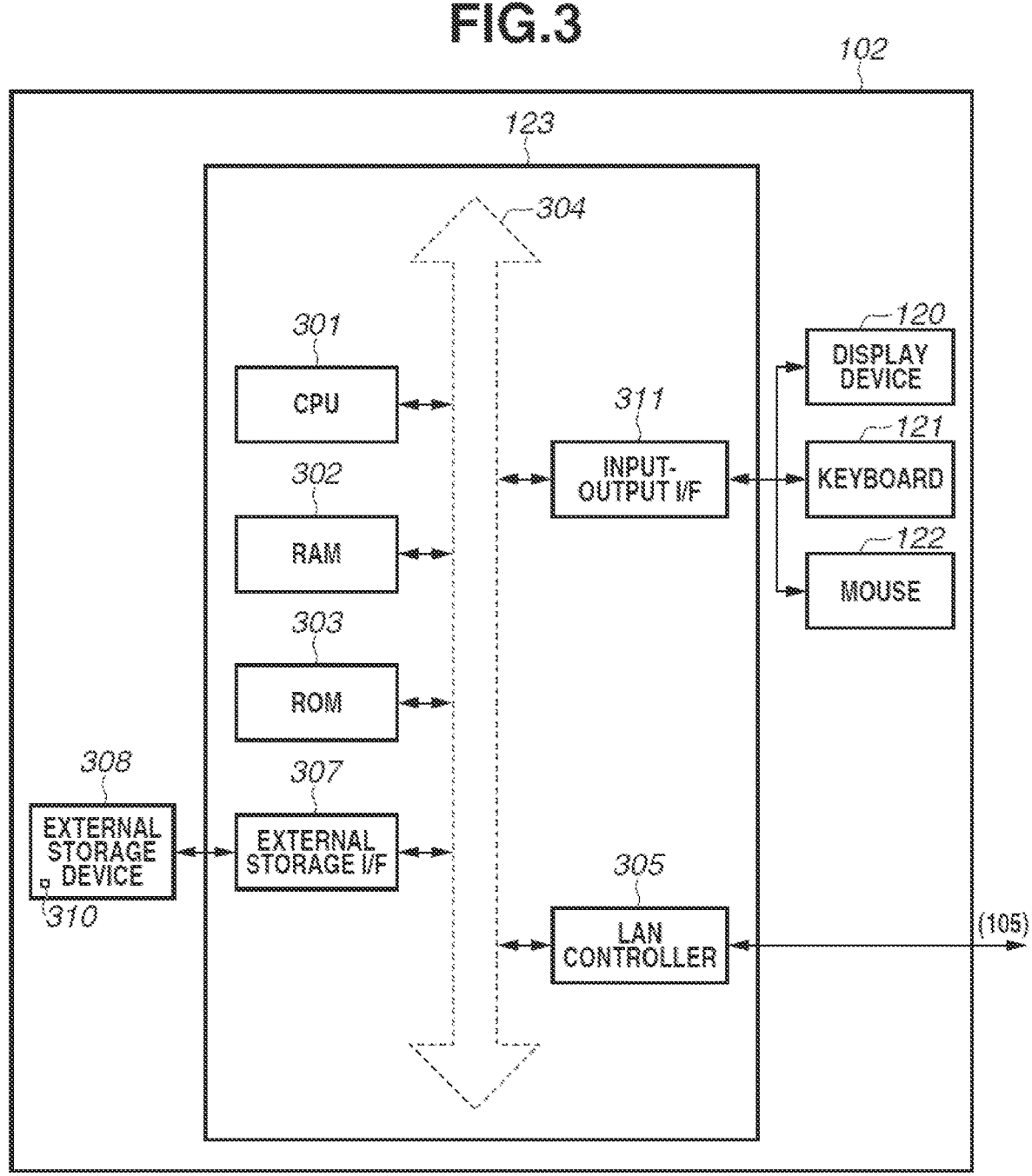
FIG. 3 is a block diagram illustrating a hardware configuration of a client computer according to the first embodiment.

FIG. 3 is a block diagram illustrating a hardware configuration of the client computer 102 illustrated in FIG. 1.

As illustrated in FIG. 3, the client computer 102 includes a display device 120, a keyboard 121, a mouse 122, and a controller 123.

The display device 120 is a display unit for displaying information, and is a liquid crystal monitor, for example. Alternatively, the display device 120 can be a device having a function of receiving an input operation from the user, such as a touch panel system display device.

The keyboard 121 and the mouse 122 are input units for receiving input operations performed by the user.

The controller 123 is a control unit for comprehensively controlling the client computer 102. The controller 123 includes a CPU 301, a RAM 302, a ROM 303, an input-output OF 311, an external storage OF 307, and a LAN controller 305.

The CPU 301 comprehensively controls access to and from various devices connected to a system bus 304 based on a control program stored in the ROM 303 or an external storage device 308. The RAM 302 mainly functions as a main memory and a work area of the CPU 301. The I/Fs 307 and 311 enable data input-output to be performed between connected devices and the CPU 301. FIG. 3 illustrates a configuration in which a plurality of devices is connected to the input-output OF 311, but separate I/Fs can be arranged depending on the number of connected devices.

The external storage device 308 is a storage unit for storing data. For example, an HDD or an SSD is used as the external storage device 308. The external storage device 308 is used for storing, for example, an application program, font data, and frame data. The LAN controller 305 (LAN I/F) communicates with the image forming apparatus 101 and an external system via the LAN 105, and transmits and receives control commands and print data.

The sheet management application is application software for an operator checking an attribute of sheets set in each of the sheet feeding trays 114 of the image forming apparatus 101, and for an operator setting attribute information of sheets in each sheet feeding tray. This application is executed by the controller 123 on the client computer 102. This application is executed in controller 123 by the CPU 301 loading a program 310 stored in the external storage device 308, onto the RAM 302.

Processing from the activation of the sheet management application according to the present embodiment up to the connection of an image forming apparatus to be operated, and screen examples will now be described in detail with reference to FIGS. 4A to 7.

Figure 4B:
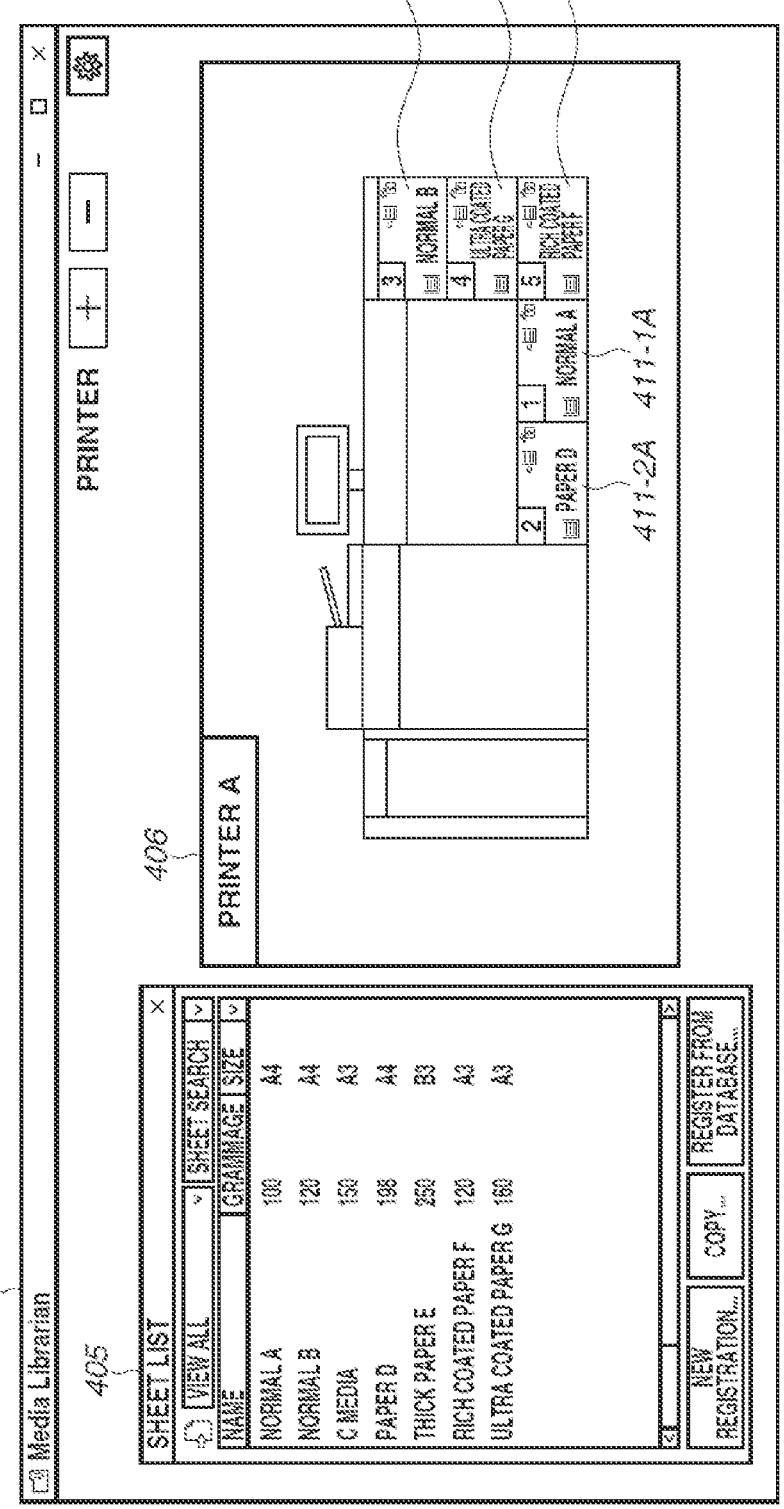
Figure 4C:
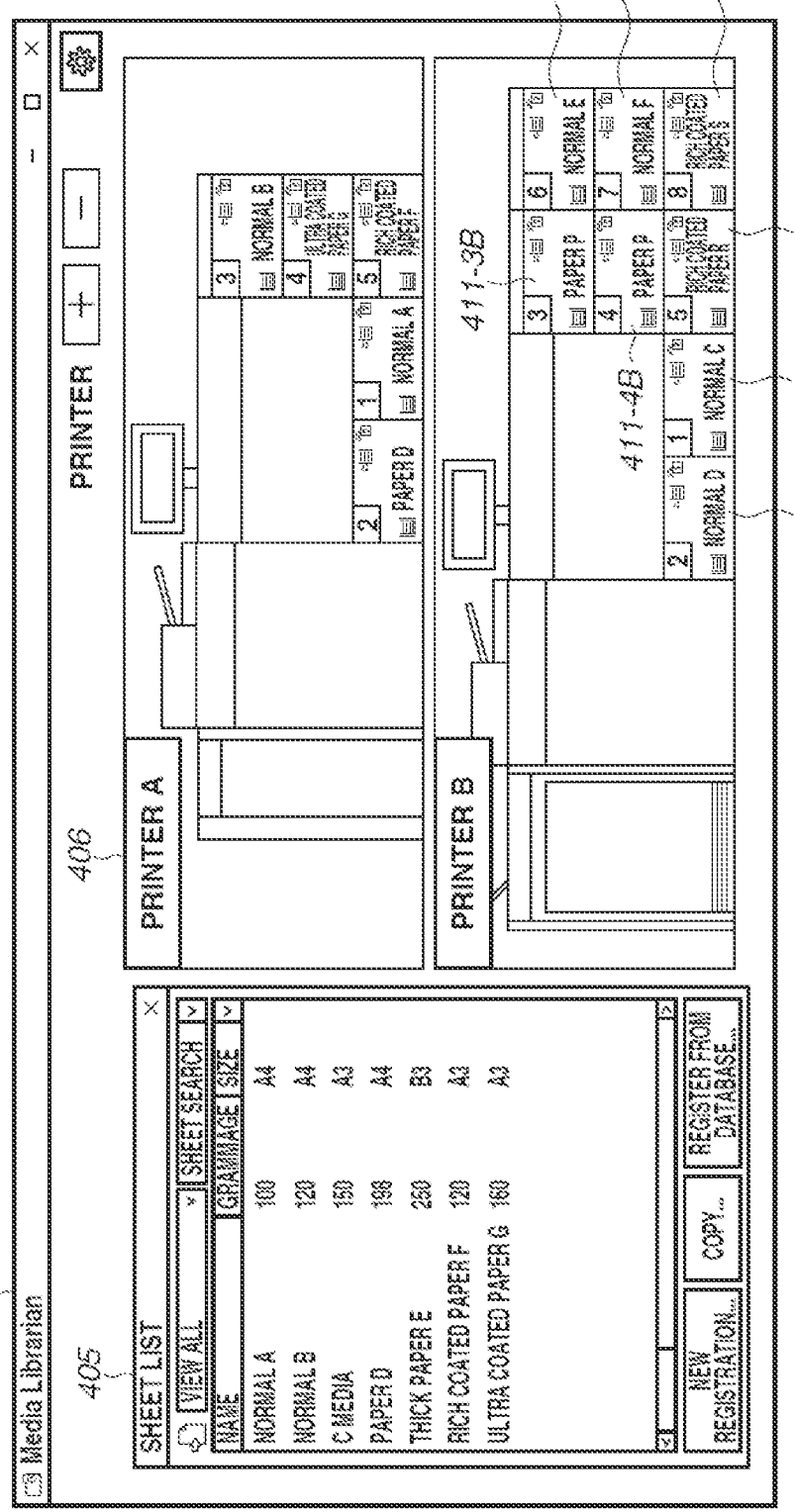

FIGS. 4A to 4C are diagrams each illustrating an example of a home screen of the sheet management application according to the present embodiment. A home screen 401 is created in the RAM 302 as drawing data in accordance with an instruction from the CPU 301. The CPU 301 displays the screen on the display device 120 based on the drawing data.

Figure 5:
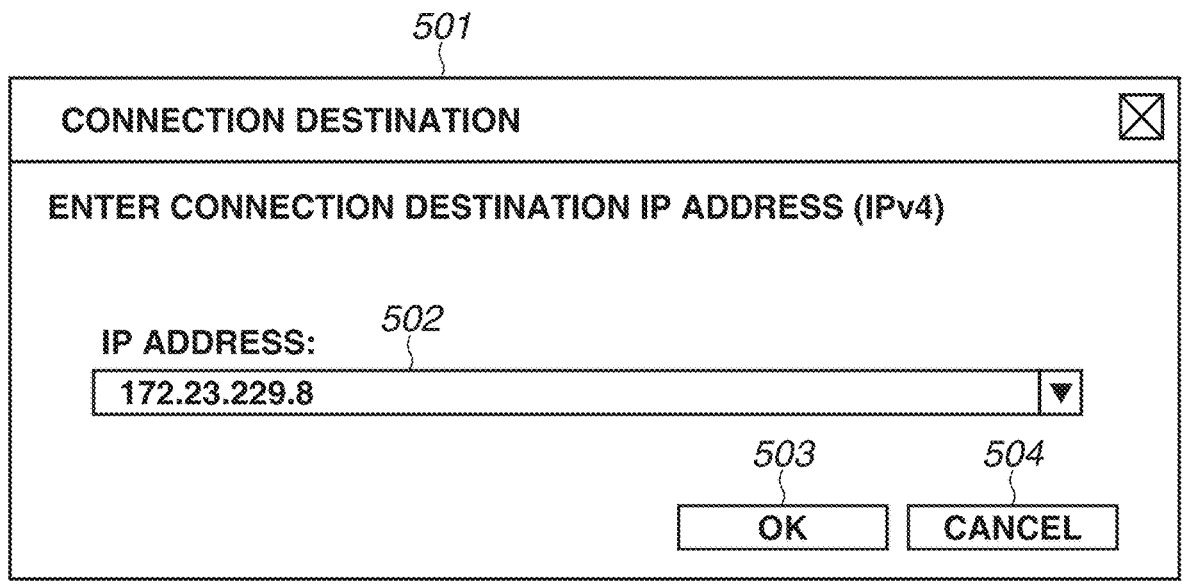
FIG. 5 is a diagram illustrating an example of a connection destination entry screen of the sheet management application according to the first embodiment.

FIG. 5 is a diagram illustrating an example of a connection destination entry screen 501 for designating via an address entry field 502 an image forming apparatus 101 to be used by one sheet management application 310 according to the present embodiment.

A connection destination entry screen 501 is created in the RAM 302 of the client computer 102 as drawing data in accordance with an instruction from the CPU 301. The CPU 301 displays the screen 501 on the display device 120 based on the drawing data.

Detailed description will be given in the description of a flowchart (FIGS. 6A-6B) to be described below.

Figure 6A:
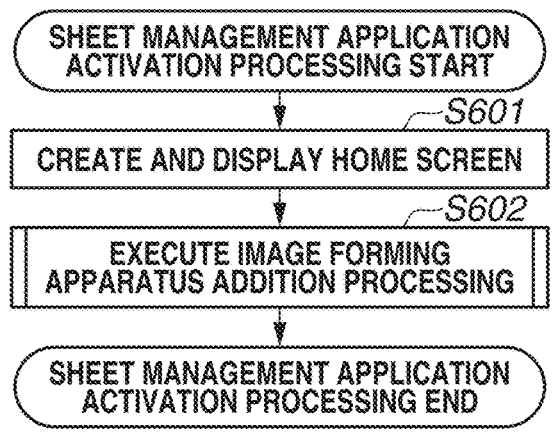
FIGS. 6A and 6B are flowcharts illustrating processing flows of sheet management application activation processing and addition processing of an image forming apparatus to be added, according to the first embodiment.
Figure 6B:
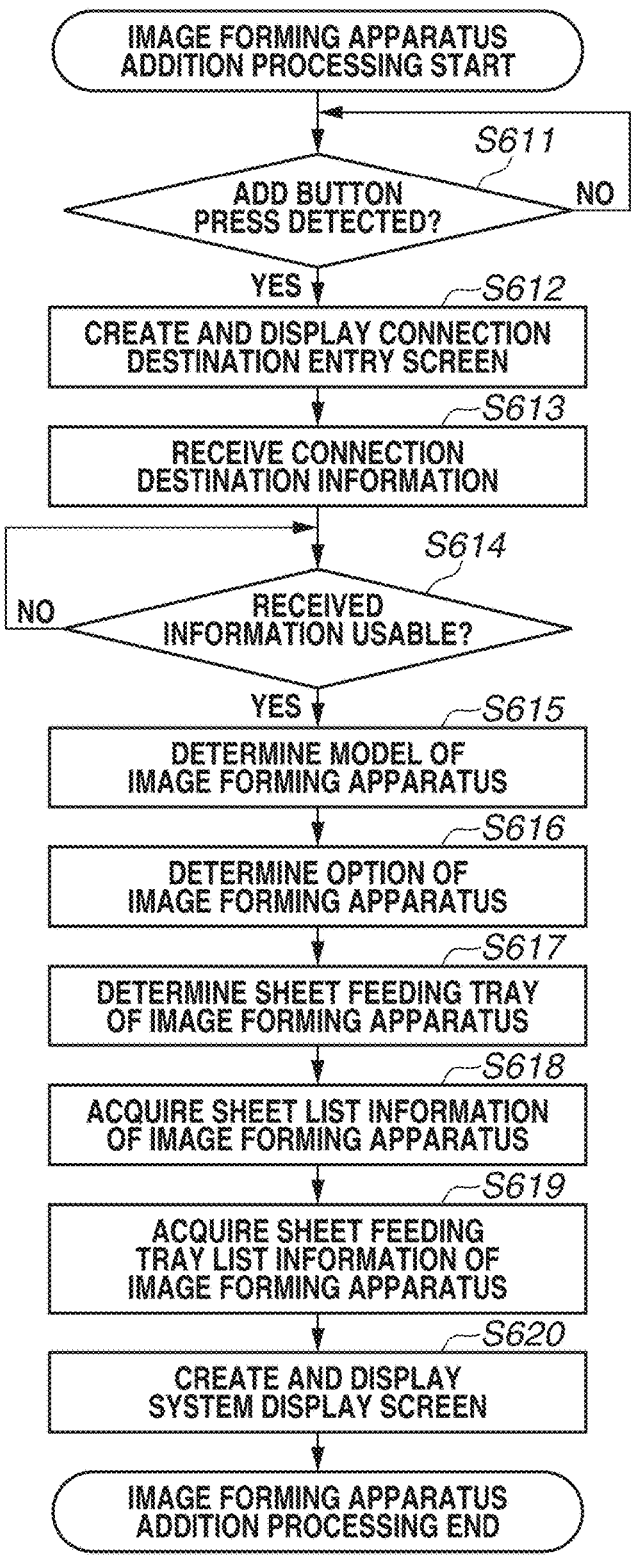

FIGS. 6A and 6B are flowcharts illustrating processing flows of one sheet management application activation processing and addition processing (connection processing) of a designated image forming apparatus, according to the present embodiment.

The processing illustrated in these flowcharts is implemented by the CPU 301 loading programs stored in the external storage device 308 onto the RAM 302 and executing the programs.

The processing flow of sheet management application activation processing will be initially described. This processing flow is started if the activation of one sheet management application performed by the user on the client computer 102 is detected. The detection of activation refers to the detection of an activation instruction of one sheet management application being issued in some way, such as an application icon (not illustrated) displayed on the display device 120, being pressed by the user via an input device.

If, in step S601, the activation is started, the CPU 301 creates a home screen 401A of the sheet management application, and displays the home screen 401A on the display device 120.

The home screen 401A includes an add button 402 for adding an image forming apparatus to be operated by the sheet management application, a delete button 403 for deleting an image forming apparatus, and a system setting button 404 for setting/configuring a system setting of the sheet management application. A sheet list display region 405 is a region for displaying a sheet list, and an information display region 406 is an information display region for displaying information regarding an image forming apparatus. Since no image forming apparatus is connected immediately after the activation, no information is displayed in the regions 405 and 406 in FIG. 4A.

When the display of the home screen 401A is completed, the CPU 301 advances the processing to step S602, in which addition processing of an image forming apparatus to be connected is executed.

FIG. 6B is a flowchart illustrating a detailed processing flow in step S602, in which addition processing of an image forming apparatus to be connected is executed.

If, in step S611, this processing flow is started, the CPU 301 determines whether the add button 402 has been pressed. If it is determined that the add button 402 has been pressed (YES in step S611), the processing proceeds to step S612. In a case where the press of the add button 402 has not been detected (NO in step S611), the CPU 301 waits in this state until the press of the add button 402 is detected.

If the press of the add button 402 has been detected in step S611 (YES in step S611), the processing proceeds to step S612. In step S612, the CPU 301 creates the connection destination entry screen 501 for connecting to an image forming apparatus to be operated by the sheet management application, and displays the connection destination entry screen 501 on the display device 120.

The connection destination entry screen 501 includes an address entry field 502, an OK button 503, and a cancel button 504. The address entry field 502 is a field for entering an Internet Protocol (IP) address or a host name of a connection destination image forming apparatus. The CPU 301 receives an entry operation from the user, and displays the entered information in the address entry field 502. The OK button 503 is a button for connecting the sheet management application to the image forming apparatus 101 in accordance with the setting entered in the address entry field 502. The cancel button 504 is a button for ending the sheet management application without connecting to the image forming apparatus 101.

In step S613, if an address is entered into the address entry field 502 and the OK button 503 is pressed on the connection destination entry screen 501, the CPU 301 receives information entered in the address entry field 502.

In following step S614, the CPU 301 determines whether connection destination information entered on the connection destination entry screen 501 is valid.

The controller 123 tries to connect the sheet management application with a connection destination designated by the entered address. In a case where the connection destination is a usable image forming apparatus 101 (YES in step S614), the CPU 301 notifies the image forming apparatus 101 of an IP address of the client computer 102, causes the image forming apparatus 101 to register the IP address, and advances the processing to the next processing. If no response is returned from the designated connection destination (NO in step S614), the CPU 301 determines that the entered connection destination information is not valid connection destination information, and waits for entry again. At this time, the CPU 301 can notify the user that the connection destination information is invalid, by controlling the display device 120 to display a message (not illustrated) indicating that connection destination information is invalid, on the connection destination entry screen 501, for example.

If the connection with the designated image forming apparatus 101 is completed, the CPU 301 subsequently determines, in step S615, a model of the image forming apparatus 101. The CPU 301 communicates with the image forming apparatus 101 and acquires model information. The CPU 301 then acquires basic configuration information by determining the model of the image forming apparatus 101 based on model determination information preliminarily held by the sheet management application. The acquired information is used in system display screen creation to be described below. If the model determination is completed in step S615, the processing proceeds to step S616.

In step S616, the CPU 301 determines optional hardware components connected to the image forming apparatus 101. The CPU 301 communicates with the image forming apparatus 101 and acquires hardware information regarding hardware components connected to the print engine 110, such as the scanner 112 and the finisher 113. The acquired information is used in system display screen creation to be described below. If, in step S616, the option determination is completed, the processing proceeds to step S617.

In step S617, the CPU 301 determines a list of sheet feeding trays connected to the image forming apparatus 101, which are to be subjected to sheet management. The CPU 301 communicates with the image forming apparatus 101 and acquires the number of connected sheet feeding trays and setting information of the sheet feeding trays. The information to be acquired in this step includes, for example, names of sheet feeding trays, and information regarding sizes and grammages of sheets settable in the sheet feeding trays. The acquired information is used in system display screen creation to be described below, or in the determination as to whether a sheet is settable in a sheet feeding tray. If the sheet feeding tray determination is completed in step S617, the processing proceeds to step S618.

FIG. 11A illustrates an example of sheet feeding tray setting information according to the present embodiment. The information is stored in the external storage device 208 of the image forming apparatus 101, and is used by being read out by the CPU 201 onto the RAM 202. In this example, the CPU 201 transmits setting information regarding a sheet feeding tray that has been read out into the RAM 202 in response to a request from the CPU 301. The controller 123 acquires the information, and uses the information for sheet feeding tray determination.

In the information, the specification of sheets settable in each sheet feeding tray is described. For example, it can be seen that, in a case where a sheet type of a sheet is thick paper and a sheet size of the sheet is A3, the sheet is settable in a tray 1 and unsettable in a tray 3.

In step S618, the CPU 301 acquires sheet list information of the image forming apparatus 101. The CPU 301 communicates with the image forming apparatus 101 and acquires sheet list information. The sheet list information to be acquired in this step includes a sheet ID and a name, for example, and parameters including attribute information used for printing. The acquired information is used in system display screen creation to be described below. If the acquisition of the sheet list information is completed, the processing proceeds to step S619.

FIG. 11B illustrates an example of sheet list information according to the present embodiment. The information is stored in the external storage device 208 of the image forming apparatus 101, and is used by being read out by the CPU 201 onto the RAM 202. In this example, the controller 115 transmits sheet list information that has been read out into the RAM 202 in response to a request from the controller 123. The controller 123 acquires the information.

In step S619, the CPU 301 acquires sheet information currently set in a sheet feeding tray list of the image forming apparatus 101. The CPU 301 communicates with the image forming apparatus 101 and acquires sheet information set (registered) for each of the sheet feeding trays determined in step S617. The acquired information is used in system display screen creation to be described below. If the acquisition of sheet feeding tray list information is completed, the processing proceeds to step S620.

FIG. 11C illustrates an example of sheet feeding tray information according to the present embodiment. The information is stored in the external storage device 208 of the image forming apparatus 101, and is used by being read out by the CPU 201 onto the RAM 202. In this example, the controller 115 transmits sheet setting information regarding sheet feeding tray lists that has been read out into the RAM 202 in response to a request from the controller 123. The CPU 301 acquires the information.

In the information, sheet information currently set in each sheet feeding tray is described.

In step S620, the CPU 301 creates a home screen 401B of the sheet management application that is illustrated in FIG. 4B based on the information acquired in steps S615 to S619, and displays the home screen 401B on the display device 120.

The home screen 401B is an example of a screen to be displayed after the connection with a first image forming apparatus 101A is completed. A difference from the home screen 401A lies in the following point.

The controller 123 displays, in the sheet list display region 405, sheet list information of the image forming apparatus 101A that has been acquired in step S618.

Furthermore, based on information regarding the image forming apparatus 101A that has been acquired in steps S615 to S617 and S619, the CPU 301 draws the shape (external appearance) of the image forming apparatus 101A and information regarding the sheet feeding tray list, in the information display region 406 of an image forming apparatus. The shape of the image forming apparatus 101A to be drawn can be determined by preliminarily holding, into the external storage device 308, a plurality of image patterns corresponding to models and options of image forming apparatuses, and information regarding sheet feeding tray lists, and by the CPU 301 selecting an image in accordance with acquired information regarding the image forming apparatus 101A. Alternatively, a configuration can be employed of holding each image into the external storage device 208 of the image forming apparatus 101, and receiving each image from the image forming apparatus 101 when an inquiry is made for determination of a model or a hardware option of the image forming apparatus 101 in step S615 or another subsequent step.

Sheet feeding trays 411 indicate information regarding a list of sheet feeding trays connected to the image forming apparatus 101A. The image forming apparatus 101A includes the five sheet feeding trays 114-1A to 114-5A, and the CPU 301 generates and draws images of sheet feeding trays 411-1A to 411-5A based on information regarding the sheet feeding tray list that has been acquired in steps S617 and S619. By viewing the screen, the user can easily identify the types of sheets currently set in the sheet feeding trays. In the present embodiment, the description has been given of an example in which only a name of sheet information set in each sheet feeding tray is displayed on an image of a corresponding sheet feeding tray, but a plurality of pieces of information such as a name, a type, and a size, can be displayed. Alternatively, the user can be enabled to set type information to be displayed with being superimposed on an image of a sheet feeding tray, from among pieces of type information indicated on a plurality of columns illustrated in FIG. 11C. In the present embodiment, the description has been given of an example in which a name is displayed with being superimposed on an image of a sheet feeding tray, but a name can be displayed near an image of a sheet feeding tray together with an arrow or a balloon indicating the sheet feeding tray.

If the creation and display of the system display screen in step S620 are completed, the controller 123 completes the detailed processing flow in step S602, in which addition processing of an image forming apparatus to be connected is executed.

Subsequently, the CPU 301 completes the processing flow of sheet management application activation processing. After the application activation, the CPU 301 waits in a state of receiving an entry operation from the user on an application screen.

Response processing to be performed in the image forming apparatus 101 in response to the sheet management application activation processing that corresponds to the above-described processing flow of the client computer 102 will be described with reference to FIG. 7.

Figure 7:
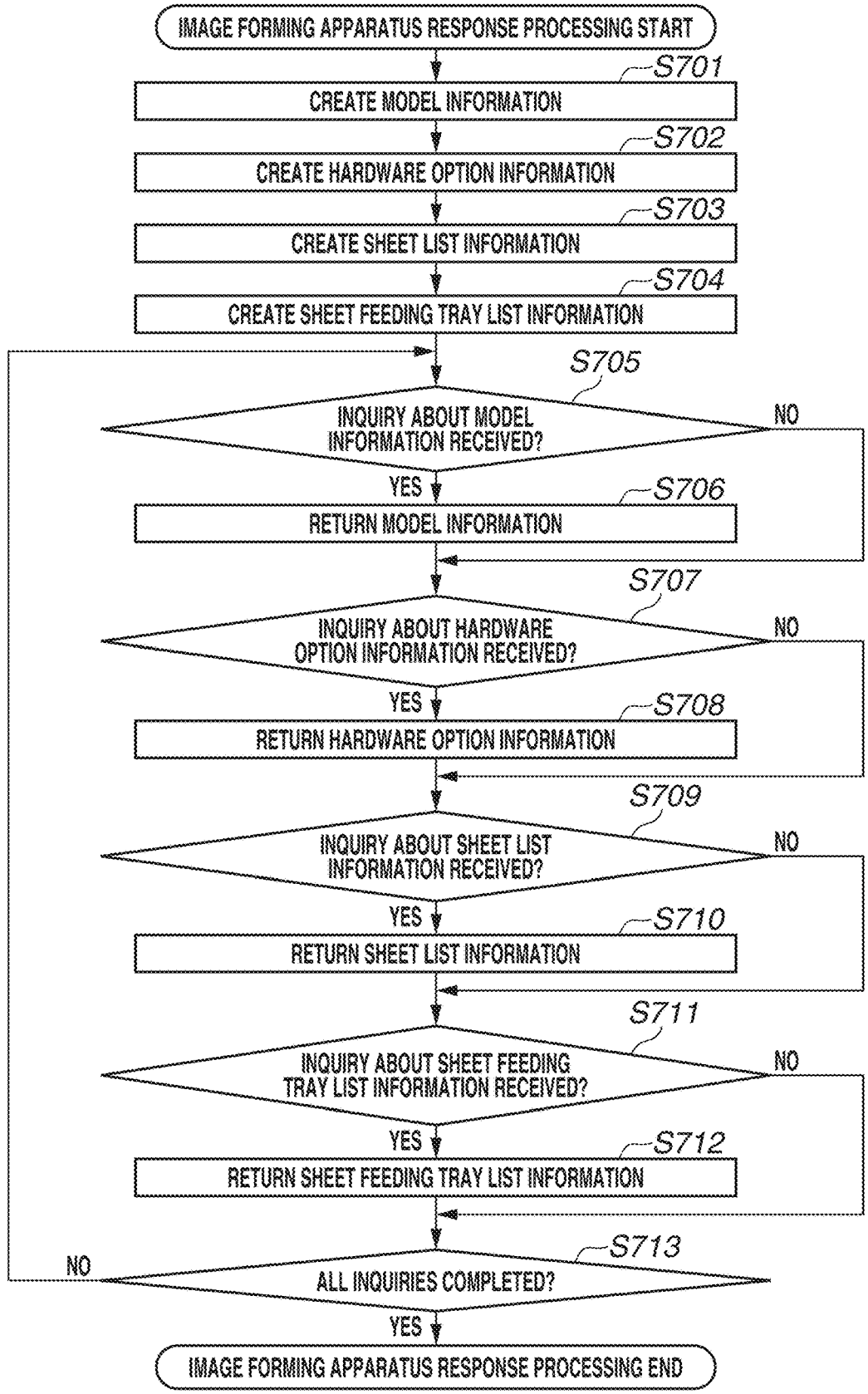
FIG. 7 is a flowchart illustrating a processing flow of image forming apparatus response processing according to the first embodiment.

FIG. 7 is a flowchart illustrating a processing flow of response processing to be executed by the image forming apparatus 101 according to the present embodiment. The processing illustrated in this flowchart is implemented by the CPU 201 loading programs stored in the external storage device 208, onto the RAM 202 and executing the programs.

In step S701, the CPU 201 acquires model information of the image forming apparatus 101 from the external storage device 208, and stores the model information into the RAM 202 in a data format transferable to another apparatus.

In step S702, the CPU 201 acquires hardware option information regarding optional hardware components connected to the image forming apparatus 101, from the print engine 110 via the printing OF 210. The CPU 201 then stores the hardware option information into the RAM 202 in a data format transferable to another apparatus.

In step S703, the CPU 201 acquires sheet list information of the image forming apparatus 101 from the external storage device 208, and stores the sheet list information into the RAM 202 in a data format transferable to another apparatus.

In step S704, the CPU 201 acquires sheet feeding tray list information of the image forming apparatus 101 from the print engine 110 via the printing OF 210. The CPU 201 then stores the sheet feeding tray list information into the RAM 202 in a data format transferable to another apparatus.

In step S705, the CPU 201 determines whether an inquiry about model information has been received from the client computer 102. If an inquiry about model information has been received (YES in step S705), the processing proceeds to step S706. In step S706, the CPU 201 returns the model information created in step S701, and the processing proceeds to following step S707. If an inquiry about model information has not been received (NO in step S705), the processing directly proceeds to step S707.

In step S707, the CPU 201 determines whether an inquiry about hardware option information has been received from the client computer 102. If an inquiry about hardware option information has been received (YES in step S707), the processing proceeds to step S708. In step S708, the CPU 201 returns the hardware option information created in step S702, and the processing proceeds to step S709. If an inquiry about hardware option information has not been received (NO in step S707), the processing proceeds to step S709.

In step S709, the CPU 201 determines whether an inquiry about sheet list information has been received from the client computer 102. If an inquiry about sheet list information has been received (YES in step S709), the processing proceeds to step S710. In step S710, the CPU 201 returns the sheet list information created in step S703, and the processing proceeds to step S711. If an inquiry about sheet list information has not been received (NO in step S709), the processing proceeds to step S711.

In step S711, the CPU 201 determines whether an inquiry about sheet feeding tray list information has been received from the client computer 102. If an inquiry about sheet feeding tray list information has been received (YES in step S711), the processing proceeds to step S712. In step S712, the CPU 201 returns the sheet feeding tray list information created in step S704, and the processing proceeds to step S713. If an inquiry about sheet feeding tray information has not been received (NO in step S711), the processing directly proceeds to step S713.

In step S713, the CPU 201 determines whether all inquiries have been completed. If inquiries have not been completed (NO in step S713), the processing returns to step S705. If all inquiries have been completed (YES in step S713), the processing flow of the response processing ends.

Heretofore, the activation of the sheet management application and the connection of the first image forming apparatus have been described based on the processing in both the client computer 102 and the image forming apparatus 101.

Next, connection with a second image forming apparatus 101B will be described.

As one of features of the sheet management system 100 according to the present embodiment, the sheet management application is configured to concurrently connect with a plurality of image forming apparatuses.

In a state in which the first image forming apparatus 101A is connected and the home screen 401B is displayed, if the add button 402 is further pressed, the CPU 301 executes the processing flow of addition processing of an image forming apparatus to be connected, which has been described with reference to FIG. 6B.

The CPU 301 executes the processing in steps S601 and S602 of FIG. 6A for the second image forming apparatus 101B. In step S602, the CPU 301 executes the processing in steps S611 to S619 of FIG. 6B. In step S620, the CPU 301 creates a home screen 401C of the sheet management application based on the information acquired in steps S615 to S619, and displays the home screen 401C on the display device 120.

The home screen 401C is an example of a screen to be displayed after the connection with the second image forming apparatus 101B is completed. A difference from the home screen 401B lies in the following point.

The CPU 301 displays sheet list information of the image forming apparatus 101A and the image forming apparatus 101B that has been acquired in step S618, in the sheet list display region 405. FIG. 4C illustrates a screen configuration in which a sheet list acquired from each image forming apparatus is displayed while switching the display using a tab. For example, sheet list information of the image forming apparatus 101A is currently displayed in the sheet list display region 405, and if the CPU 301 detects the press of a tab button of the image forming apparatus 101B on the screen, the CPU 301 switches the display to sheet list information acquired from the image forming apparatus 101B, and displays the sheet list information in the sheet list display region 405. The display configuration of sheet list information to be displayed in the sheet list display region 405 needs not always be this configuration. For example, a plurality of pieces of sheet list information acquired from a plurality of connected image forming apparatuses can be combined and displayed at one time as a single piece of sheet list information.

Furthermore, in the information display region 406 of an image forming apparatus, the CPU 301 draws two image forming apparatuses e.g., the image forming apparatus 101A and the image forming apparatus 101B, and information regarding sheet feeding tray lists. In the present embodiment, the description has been given of an example in which only a name of sheet information set in each sheet feeding tray of the image forming apparatus 101B is displayed on an image of a corresponding sheet feeding tray, but a plurality of pieces of information, such as a name, a type, and a size, can also be displayed. Alternatively, the user can be enabled to set type information to be displayed with being superimposed on an image of a sheet feeding tray, from among pieces of type information indicated on the plurality of columns in FIG. 11C. In the present embodiment, the description has been given of an example in which a name is displayed with being superimposed on an image of a sheet feeding tray, but a name can be displayed near an image of a sheet feeding tray together with an arrow or a balloon indicating the sheet feeding tray. A drawing procedure is the same as the method described in the description of the home screen 401B, and therefore the description will be omitted. By the controller 123 displaying the two image forming apparatuses in parallel on the same screen, the user can simultaneously identify the sheet feeding trays 411-1A to 411-5A of the image forming apparatus 101A and sheet feeding trays 411-1B to 411-8B of the image forming apparatus 101B.

Heretofore, a method of connecting two image forming apparatuses and displaying images of the image forming apparatuses on the same screen has been described. However, the number of image forming apparatuses to be connected is not limited to two. A configuration in which three or more image forming apparatuses are connected can also be employed. The CPU 301 can display all of a plurality of connected image forming apparatuses in the information display region 406 of an image forming apparatus, or information regarding an image forming apparatus that is to be displayed can be switched on a screen using a tab function, for example.

Subsequently, processing of setting sheets in sheet feeding trays, which is a characteristic of the sheet management application in the sheet management system 100 according to the present embodiment, will be described with reference to FIGS. 8 to 10.

One function of the sheet management application is performing the setting of a sheet in a sheet feeding tray in accordance with a user operation. In Japanese Patent Application Laid-Open No. 2018-86766 described above, one sheet is selected and detected by the user from a sheet list displayed in the sheet list display region 405 in the configuration of the home screen 401B in which one image forming apparatus is connected. Subsequently, one sheet feeding tray is selected by the user from among sheet feeding trays of the image forming apparatus that are displayed in the information display region 406 of an image forming apparatus. Through the detection of the series of operations, the CPU 301 sets selected sheet information in a selected sheet feeding tray.

In the present embodiment, there is a unit included that sets, in the home screen 401C in which two image forming apparatuses are connected, sheet information set in a sheet feeding tray of a certain image forming apparatus, into a sheet feeding tray of another image forming apparatus. A sheet setting is copied by a simple user operation from a sheet feeding tray (e.g., the sheet feeding tray 411-1A) of a first image forming apparatus (e.g., the image forming apparatus 101A) to a sheet feeding tray (e.g., the sheet feeding 411-8B) of a second image forming apparatus (e.g., the image forming apparatus 101B).

Figure 8:
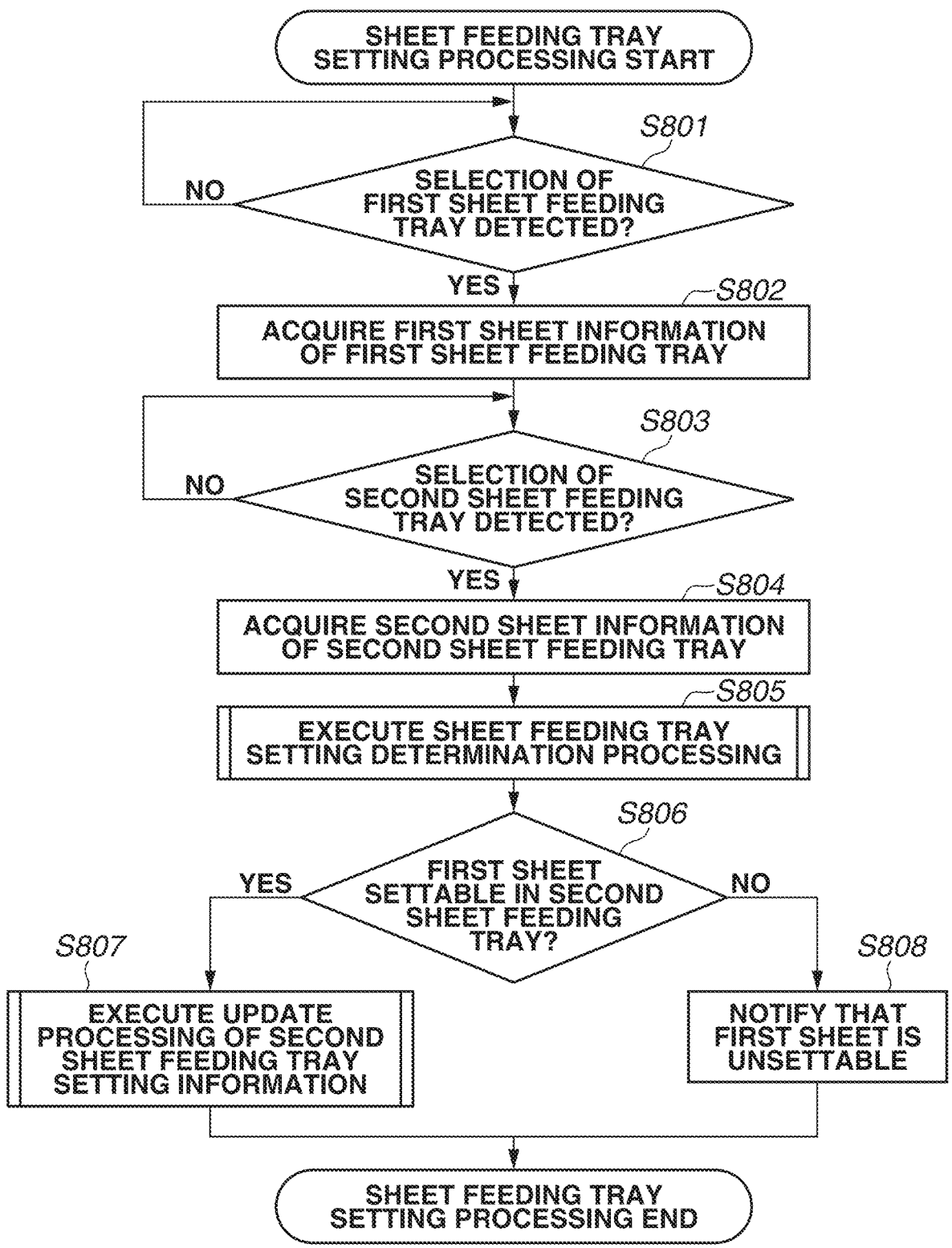
FIG. 8 is a flowchart illustrating a processing flow of sheet feeding tray setting processing to be executed by the sheet management application according to the first embodiment.

FIG. 8 is a flowchart illustrating sheet feeding tray setting processing to be executed by the sheet management application according to the present embodiment. The processing illustrated in the flowchart is implemented by the CPU 301 loading programs stored in the external storage device 308 onto the RAM 302 and executing the programs.

This processing flow is started as a state of waiting for the detection of a predetermined operation to be performed by the user on the home screen 401C after application activation processing and connection processing of two image forming apparatuses are completed on the client computer 102.

If, in step S801, the home screen 401C is displayed, the CPU 301 determines whether selection of a first sheet feeding tray by a user operation has been detected. As an example here, it is assumed that the first sheet feeding tray is the sheet feeding tray 411-1A of the image forming apparatus 101A. It is also assumed that the detection of the selection by the user is the detection performed by the CPU 301 determining whether a region of the sheet feeding tray 411-1A in the information display region 406 of an image forming apparatus that is drawn on the home screen 401C has been pressed by an operation performed by the user using the mouse 122, for example. Aside from a click operation performed using the mouse 122, the state detected by the CPU 301 can be determined whether an enter key has been pressed on the keyboard 121 in a state in which the sheet feeding tray 411-1A is selected.

In step S802, the CPU 301 acquires first sheet information currently set in the first sheet feeding tray 411-1A selected in step S801. The CPU 301 identifies the first sheet information set in the first sheet feeding tray 411-1A based on sheet list information acquired in step S618 and sheet feeding tray information acquired in step S619 in the addition processing of an image forming apparatus to be connected.

In step S803, the CPU 301 determines whether selection of a second sheet feeding tray by a user operation has been detected. As an example here, it is assumed that the second sheet feeding tray is the sheet feeding tray 411-8B of the image forming apparatus 101B. It is also assumed that the detection of the selection by the user is the detection performed by the CPU 301 determining whether a region of the sheet feeding tray 411-8B in the information display region 406 of an image forming apparatus that is drawn on the home screen 401C has been pressed by an operation performed by the user using the mouse 122, for example. Aside from a click operation performed using the mouse 122, the state detected by the CPU 301 can be determined whether an enter key has been pressed on the keyboard 121 in a state in which the sheet feeding tray 411-8B is selected.

Furthermore, operations to be detected in steps S801 and S803 can be a series of consecutive operations, such as a drag-and-drop operation or a touch-and-release operation. Specifically, the mouse 122 is pressed on the first sheet feeding tray 411-1A by the user (step S801), the position of the mouse 122 is moved to the second sheet feeding tray 411-8B in the pressed state, and the press of the mouse 122 is canceled (step S803). The controller 123 thereby detects two sheet feeding trays, which serve as processing targets.

In step S804, the CPU 301 acquires sheet feeding tray information of the second sheet feeding tray 411-8B selected in step S803. The CPU 301 acquires restriction information of sheets settable in the second sheet feeding tray 411-8B based on information regarding the setting of a sheet feeding tray that has been acquired in step S617 in the addition processing of an image forming apparatus to be connected.

If the first sheet information and the second sheet feeding tray information are acquired, the CPU 301 advances the processing to step S805, and executes sheet feeding tray setting determination processing.

The determination processing to be executed in this step will now be described in detail with reference to FIG. 9.

Figure 9:
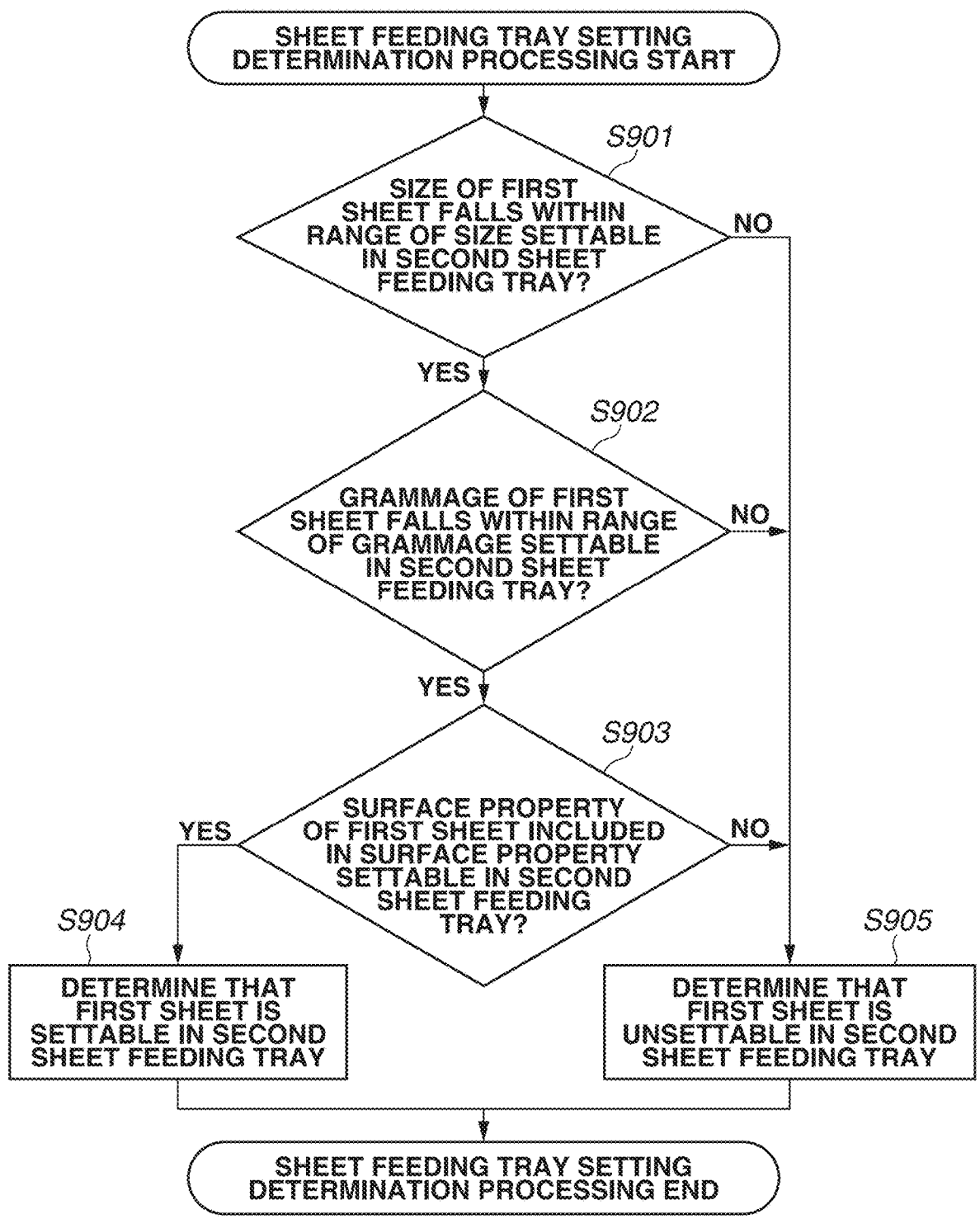
FIG. 9 is a flowchart illustrating a processing flow of sheet feeding tray setting determination processing to be executed by the sheet management application according to the first embodiment.

FIG. 9 is a flowchart illustrating a processing flow of determining a sheet feeding tray setting that is to be executed by the sheet management application according to the present embodiment. The processing illustrated in the flowchart is implemented by the CPU 301 loading programs stored in the external storage device 308, onto the RAM 302 and executing the programs.

In step S901, the CPU 301 compares sheet sizes of a first sheet and sheets in the second sheet feeding tray. The sheet size is an example of a basic attribute information of a sheet which may include information indicating vertical and horizontal lengths of the sheet. Specifically, the CPU 301 determines whether the size of the first sheet falls within the range of sizes of sheets that can be fed from the second sheet feeding tray. If the size of the first sheet falls within the range of sizes of sheets that can be fed from the second sheet feeding tray (YES in step S901), the processing proceeds to step S902. If the size of the first sheet exceeds the range of sizes of sheets that can be fed from the second sheet feeding tray (NO in step S901), the processing proceeds to step S905.

In step S902, the CPU 301 compares grammages of the first sheet and sheets in the second sheet feeding tray. A grammage is an example of a basic attribute information of a sheet which may include information indicating the weight and thickness of the sheet. Specifically, the CPU 301 determines whether the grammage of the first sheet falls within the range of grammages of sheets that can be fed from the second sheet feeding tray. If the grammage of the first sheet falls within the range of grammages of sheets that can be fed from the second sheet feeding tray (YES in step S902), the processing proceeds to step S903. If the grammage of the first sheet exceeds the range of grammages of sheets that can be fed from the second sheet feeding tray (NO in step S902), the processing proceeds to step S905.

In step S903, the CPU 301 compares surface properties of the first sheet and sheets in the second sheet feeding tray. A surface property is an example of a basic attribute information of a sheet which may include information regarding the material and surface coating of the sheet. Specifically, the CPU 301 determines whether the surface property of the first sheet is included in the surface properties of sheets that can be fed from the second sheet feeding tray. If the surface property of the first sheet is included in the surface properties of sheets that can be fed from the second sheet feeding tray (YES in step S903), the processing proceeds to step S904. If the surface property of the first sheet is not included in the surface properties of sheets that can be fed from the second sheet feeding tray (NO in step S903), the processing proceeds to step S905.

If it is determined under all conditions that the first sheet is settable in the second sheet feeding tray, the processing proceeds to step S904. In step S904, the CPU 301 determines that the first sheet is settable in the second sheet feeding tray, and ends this processing flow.

If it is determined that the first sheet is unsettable in the second sheet feeding tray in any of the determination processing in steps S901 to S903, the processing proceeds to step S905. In step S905, the CPU 301 determines that the first sheet is unsettable in the second sheet feeding tray, and ends this processing flow.

If the processing flow in FIG. 9 ends, the processing returns to the processing flow in FIG. 8. In step S806, the CPU 301 checks a result of the determination processing in step S805. If it is determined that the first sheet is settable in the second sheet feeding tray, the processing proceeds to step S807. If it is not determined that the first sheet is settable in the second sheet feeding tray, the processing proceeds to step S808.

In step S807, the CPU 301 executes processing of updating setting information of the second sheet feeding tray.

The update processing to be executed in this step will be described in detail with reference to FIG. 10.

Figure 10:
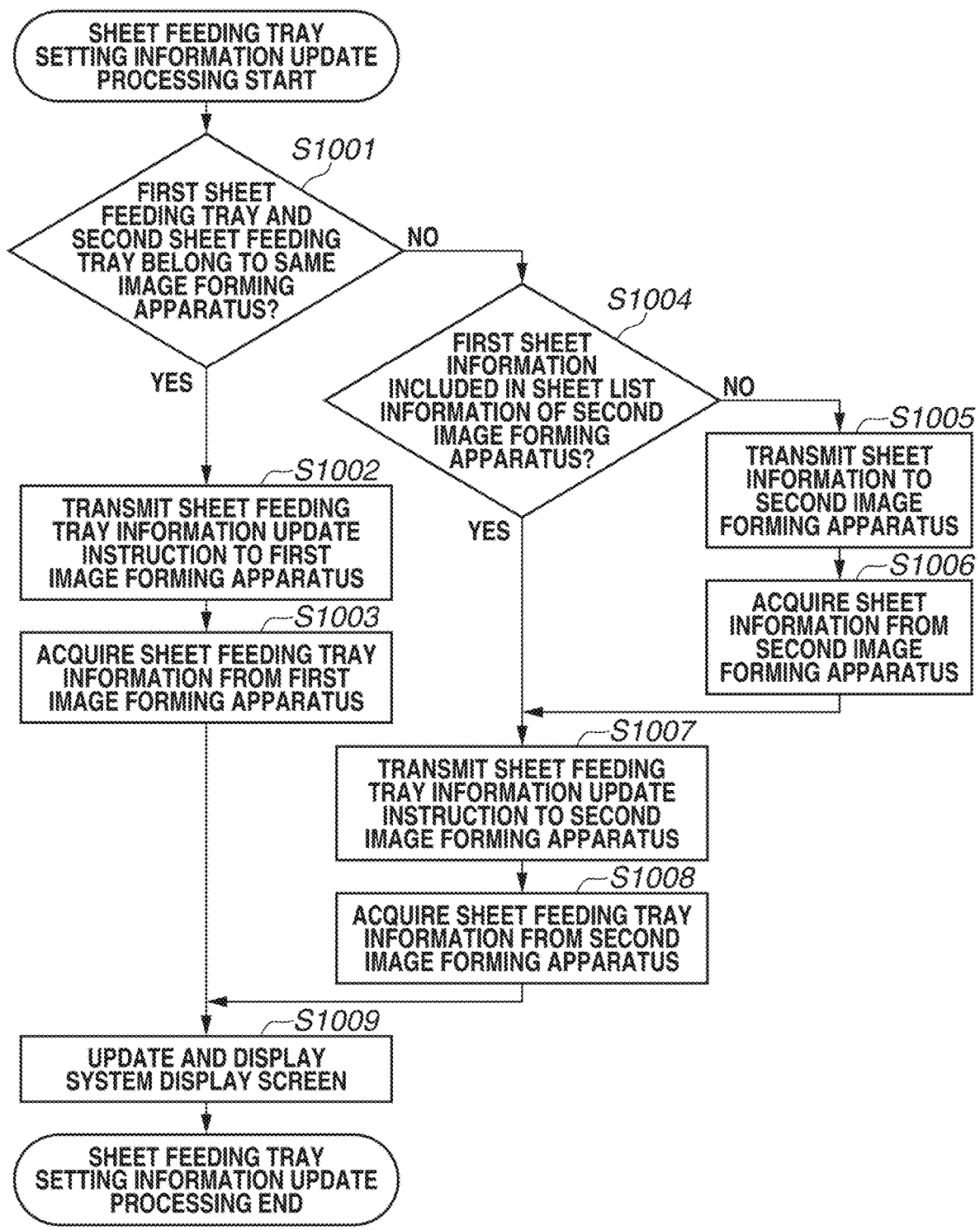
FIG. 10 is a flowchart illustrating a processing flow of sheet feeding tray setting information update processing to be executed by the sheet management application according to the first embodiment.

FIG. 10 is a flowchart illustrating a processing flow of updating sheet feeding tray setting information that is to be executed by the sheet management application according to the present embodiment. The processing illustrated in the flowchart is implemented in the controller 123 by the CPU 301 loading programs stored in the external storage device 308 onto the RAM 302 and executing the programs.

In step S1001, the CPU 301 determines whether the first sheet feeding tray in which the first sheet is set and the second sheet feeding tray belong to the same image forming apparatus. Belonging to the same image forming apparatus means that image forming apparatuses to which the first sheet feeding tray and the second sheet feeding tray selected in steps S801 and S803, respectively, belong correspond to the same connection destination image forming apparatus. Hereinafter, an image forming apparatus to which the first sheet feeding tray belongs will be referred to as a first image forming apparatus, and an image forming apparatus to which the second sheet feeding tray belongs will be referred to as a second image forming apparatus. If the first image forming apparatus to which the first sheet feeding tray selected in step S801 belongs, and the second image forming apparatus to which the second sheet feeding tray selected in step S803 belongs correspond to the same image forming apparatus (YES in step S1001), the processing proceeds to step S1002. This condition is satisfied, for example, when the first sheet feeding tray is the sheet feeding tray 411-1A of the image forming apparatus 101A and the second sheet feeding tray is the sheet feeding tray 411-5A of the image forming apparatus 101A. If the first image forming apparatus and the second image forming apparatus do not correspond to the same image forming apparatus (NO in step S1001), the processing proceeds to step S1004. For example, when the first sheet feeding tray is the sheet feeding tray 411-1A of the image forming apparatus 101A and the second sheet feeding tray is the sheet feeding tray 411-8B of the image forming apparatus 101B, the processing proceeds to step S1004.

In step S1002, the CPU 301 transmits an instruction to change setting information of the second sheet feeding tray to first sheet information, to the first image forming apparatus.

In the first image forming apparatus 101A, if the CPU 201 receives setting information of the second sheet feeding tray 411-5A, the CPU 201 updates information regarding the sheet feeding tray that is stored in the RAM 202. The CPU 201 then transmits updated sheet feeding tray information to the client computer 102.

Because response processing of the image forming apparatus 101 is the same as the processing in step S712, the illustration in the drawing and the description will be omitted.

In step S1003, the CPU 201 acquires the updated sheet feeding tray information from the first image forming apparatus 101A. If the acquisition is completed, the processing proceeds to step S1009.

If it is determined in step S1001 that the first image forming apparatus and the second image forming apparatus are different image forming apparatuses (NO in step S1001), the processing proceeds to step S1004. In step S1004, the CPU 201 determines whether the first sheet information is included in the sheet list information of the second image forming apparatus 101B.

If it is determined that the first sheet information is included in the sheet list information of the second image forming apparatus 101B (YES in step S1004), the processing proceeds to step S1007. If it is determined that the first sheet information is not included in the sheet list information of the second image forming apparatus 101B (NO in step S1004), the processing proceeds to step S1005.

In step S1005, the CPU 301 transmits the first sheet information to the second image forming apparatus 101B.

In the second image forming apparatus 101B, if the CPU 201 receives the first sheet information, the CPU 201 adds the first sheet information to the sheet list information stored in the RAM 202. The CPU 201 then transmits updated sheet list information to the client computer 102. Response processing of the image forming apparatus 101 is the same as the processing in step S710, and thus the illustration in the drawing and the description will be omitted.

In step S1006, the CPU 301 acquires the updated sheet list information from the second image forming apparatus 101B. When the acquisition is completed, the processing proceeds to step S1007.

If the first sheet information to be added from the first image forming apparatus is now added to the sheet list information of the second image forming apparatus 101B, the CPU 301 transmits, in step S1007, an instruction to change setting information of the second sheet feeding tray to the first sheet information, to the second image forming apparatus.

In the second image forming apparatus 101B, if the CPU 201 receives setting information of the second sheet feeding tray 411-8B, the CPU 201 updates setting information of the second sheet feeding tray 411-8B stored in the RAM 202 to the first sheet information. The CPU 201 then transmits updated sheet feeding tray information to the client computer 102. Response processing of the image forming apparatus 101 is the same as the processing in step S712, and thus the illustration in the drawing and the description will be omitted.

In step S1008, the CPU 301 acquires the updated sheet feeding tray information from the second image forming apparatus 101B. When the acquisition is completed, the processing proceeds to step S1009.

If the processing in step S1003 or S1008 ends, the CPU 301 updates, in step S1009, the home screen (system display screen) 401C, and causes the display device 120 to display the home screen 401C. Specifically, sheet information set in the second sheet feeding tray 411-8B is updated to be the same information as sheet information set in the first sheet feeding tray 411-1A. When the home screen 401C is updated, the CPU 301 ends this processing flow.

Back in step S807, if setting information update processing of the second sheet feeding tray is completed, the CPU 301 ends the processing flow.

If, in step S806, it is determined that the first sheet is unsettable in the second sheet feeding tray (NO in step S806), the processing proceeds to step S808. In step S808, the CPU 301 notifies the user that the first sheet is unsettable in the second sheet feeding tray. For example, the CPU 301 creates a message screen (not illustrated) indicating that the first sheet is unsettable in the second sheet feeding tray, and causes the display device 120 to display the message screen.

Through the above processing, the sheet management system 100 implements, by a simple operation, the copy of a sheet setting from a sheet feeding tray to a sheet feeding tray that are desired by the user.

According to the present embodiment as described above, the sheet management application can connect to a plurality of image forming apparatuses, and display, on a screen, information set in sheet feeding trays of the image forming apparatuses. The user can thereby check sheet setting information of sheet feeding trays of a plurality of image forming apparatuses at one time, and easily manage sheet setting information. Furthermore, sheets can be set in sheet feeding trays between a plurality of image forming apparatuses by a simple operation, operability thereby improves.

In the first embodiment, the description has been given of a method of implementing, by a simple operation, copy of a sheet setting from a sheet feeding tray to a sheet feeding tray that are desired by the user, between different image forming apparatuses.

In a second embodiment, the description will be given of a method of enabling sheet information to be copied, to be selected for each parameter, for the purpose of further improvement in operability.

Features of parameters included in sheet information will be described. The parameters included in sheet information is broadly classified into two groups. The first group includes parameters called basic attributes. These parameters indicate unchangeable information unique to a sheet. Samples of the basic attributes include a name, a type, a size, a grammage, and a surface property of the sheet. Parameters other than the basic attributes including changeable information are classified into other attributes. Samples of the other attributes (the second group) include an image position adjustment parameter, and a transfer voltage adjustment parameter. These parameters are changeable parameters to be updated if adjustment is executed in accordance with an image quality state of an image forming apparatus, and can become valid parameters only in an image forming apparatus in which adjustment has been executed.

Thus, in the present embodiment, a function is provided of selecting whether to copy only basic attributes, copy all attributes, or copy individually-selected parameters in the case of copying a sheet setting to a different image forming apparatus, and a sheet setting is copied by a method desired by the user.

FIGS. 12A and 12B are diagrams illustrating an example of a sheet information copy setting screen according to the present embodiment. A sheet copy setting screen 1201 is created in the RAM 302 as drawing data in accordance with an instruction from the CPU 301. The CPU 301 outputs the drawing data to the display device 120 to display the drawing data on the display device 120.

If the CPU 301 determines in step S1004 that the first sheet information is not included in the sheet list information of the second image forming apparatus (NO in step S1004), the CPU 301 creates the screen 1201 and displays the screen 1201 on the display device 120.

The sheet copy setting screen 1201 includes three selection items corresponding to methods 1202 to 1204, and the user selects any one of these. The method 1202 is a method of setting only basic attributes as parameters to be copied. The method 1203 is a method of setting all pieces of attribute information as parameters to be copied. The method 1204 is a method of prompting the user to select parameters to be copied. If an OK button 1205 is pressed in a state in which any one of the methods 1202 to 1204 is selected, the CPU 301 determines sheet information to be transmitted to the second image forming apparatus in step S1005, based on the designated method.

If the method 1202 of copying only basic attributes is selected on the sheet copy setting screen 1201, the CPU 301 sets default values preset by the image forming apparatus, as values of other attribute parameters not to be copied.

If the detail selection method 1204 is selected on the sheet copy setting screen 1201, the CPU 301 creates a detail selection screen 1211 and causes the display device 120 to display the detail selection screen 1211. A list of parameters included in sheet information is displayed in a region 1213. If an arbitrary parameter is selected in accordance with a user operation, a checkmark is put into a box 1212 in such a manner that the selected parameter is identifiable. If an OK button 1214 is pressed, the CPU 301 sets only a checked parameter as a parameter to be copied, closes the detail selection screen 1211, and returns to the sheet copy setting screen 1201. A default value preset by the image forming apparatus is used as a value of an unchecked parameter.

The description has been given of an example of a screen configuration of prompting the user to select a method from among three methods including the detail selection method of parameters, to perform sheet copy. However, a screen configuration of prompting the user to select a method from two methods (e.g., the method 1202 of copying only basic attributes and the method 1203 of copying all attributes) can be employed.

According to the present embodiment as described above, it is possible to execute desired processing using a simple operation by including a unit of prompting the user to select a parameter to be copied from among parameters included in sheet information, when copying sheet information to a different image forming apparatus.

In the first and second embodiments, the description has been given of the sheet management system configured to manage sheet information individually owned by each image forming apparatus.

In a third embodiment, a configuration of managing sheet list information in common will be described as another configuration of the sheet management system.

Figure 13:
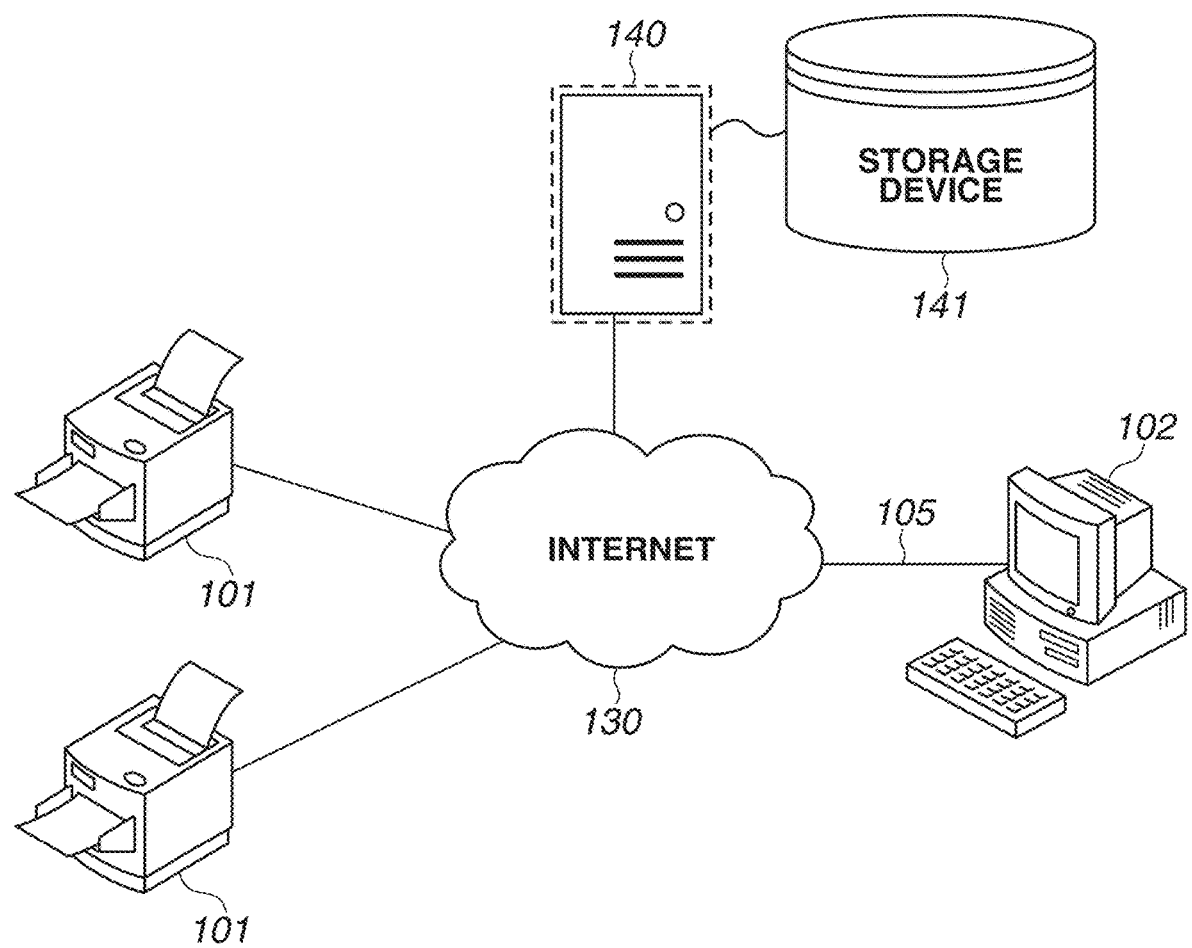
FIG. 13 is a diagram illustrating an overall configuration of a printing management system according to a third embodiment.

FIG. 13 is a diagram illustrating an overall system configuration of a sheet management system according to the present embodiment.

A sheet management system 100 includes an image forming apparatus (printer) 101, a client computer 102 communicably connected via an internet 130, and a cloud server 140 communicably connected via the internet 130.

The cloud server 140 includes a storage device 141 that stores common sheet list information. If the cloud server 140 receives an information notification request from the image forming apparatus 101 and the client computer 102, the cloud server 140 transmits sheet list information. The cloud server 140 also has a function of updating common sheet list information upon receiving sheet information addition/deletion update information from the image forming apparatus 101.

Basic operations of the image forming apparatus 101 and the client computer 102 that are related to sheet management are the same as the operations described in the first and second embodiments, the detailed description will be omitted.

Differences lie in the following points. In step S618 in the addition processing flow of an image forming apparatus to be connected, the CPU 301 of the client computer 102 inquires not of the image forming apparatus 101 but of the cloud server 140 to acquire sheet list information of an image forming apparatus. In addition, the sheet list information creation in step S703 in the response processing flow of the image forming apparatus is not executed, and the receiving processing of a sheet list information inquiry (step S709) and the return processing of sheet list information (step S710) are executed not by the image forming apparatus 101 but by the cloud server 140.

According to the present embodiment as described above, it is possible for the sheet management application to execute a setting change of a sheet feeding tray using a simple operation performed by the user even in a system configuration of unifying, with a cloud server, the management of sheet list information common to a plurality of image forming apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-105517, filed Jun. 30, 2022, which is hereby incorporated by reference herein in its entirety.

What is claimed is:

1. A non-transitory computer-readable storage medium storing a program for causing a computer to execute a control method for controlling an information processing apparatus, the control method comprising:
   acquiring first sheet information registered in a first sheet storage of a first image forming apparatus and second sheet information registered in a second sheet storage of a second image forming apparatus; and
   causing a display device to display a screen having images of the first and second image forming apparatuses,
   wherein the image of the first image forming apparatus is displayed as an external appearance of the first image forming apparatus and the image of the second image forming apparatus is displayed as an external appearance of the second image forming apparatus, and
   wherein, in a manner identifiable to a user, the first sheet information is displayed as superimposed on an image of the first sheet storage of the first image forming apparatus and the second sheet information is displayed as superimposed on an image of the second sheet storage of the second image forming apparatus.

2. The non-transitory computer-readable storage medium according to claim 1, wherein acquiring includes acquiring the first sheet information from the first image forming apparatus, and acquiring the second sheet information from the second image forming apparatus.

3. The non-transitory computer-readable storage medium according to claim 1,
   wherein the information processing apparatus is configured to communicate with the first image forming apparatus and the second image forming apparatus via a network, and
   wherein acquiring includes acquiring the first sheet information from the first image forming apparatus via the network, and acquiring the second sheet information from the second image forming apparatus via the network.

4. The non-transitory computer-readable storage medium according to claim 1, the control method further comprising selecting an image forming apparatus from among a plurality of image forming apparatuses including the first image forming apparatus and the second image forming apparatus, in accordance with an instruction from the user,
   wherein, in a case where the first image forming apparatus and the second image forming apparatus are selected, causing the display device to display includes causing the display device to display in a manner identifiable to the user that the acquired first sheet information is sheet information registered in the first sheet storage and that the acquired second sheet information is sheet information registered in the second sheet storage.

5. The non-transitory computer-readable storage medium according to claim 1, wherein the control method is executed on a single application program, wherein the single application program causes the display device to display in a manner identifiable to the user that the acquired first sheet information is sheet information registered in the first sheet storage and that the acquired second sheet information is sheet information registered in the second sheet storage.

6. The non-transitory computer-readable storage medium according to claim 1, the control method further comprising:
   designating a sheet storage from among a plurality of sheet storages including the first sheet storage and the second sheet storage; receiving an instruction to change sheet information registered in the second sheet storage to the first sheet information registered in the designated first sheet storage; and
   changing sheet information registered in the second sheet storage to the first sheet information registered in the designated first sheet storage based on the received instruction.

7. The non-transitory computer-readable storage medium according to claim 6, wherein the instruction is received by a drag and drop operation performed by the user of the information processing apparatus.

8. The non-transitory computer-readable storage medium according to claim 6, wherein the instruction is received by a touch and release operation performed by the user of the information processing apparatus.

9. The non-transitory computer-readable storage medium according to claim 1, wherein causing the display device to display includes causing the display device to add the image of the first image forming apparatus to the screen.

10. The non-transitory computer-readable storage medium according to claim 1, wherein the first sheet information is a type of sheets stored in a sheet feeding tray of the first image forming apparatus and the second sheet information is a type of sheets stored in a sheet feeding tray of the second image forming apparatus, the first image forming apparatus and the second image forming apparatus each being configured to be managed through the program by the user as an operator of each of the first and second image forming apparatuses.

11. The non-transitory computer-readable storage medium according to claim 1, wherein the first and second sheet storages are sheet feeding trays and the program is a sheet management application configured to allow the user to check an attribute of sheets placed in each sheet feeding tray of the first and second image forming apparatuses, and to set attribute information of sheets in each sheet feeding tray.

12. The non-transitory computer-readable storage medium according to claim 1, wherein the images of the first and second image forming apparatuses are drawn images of an external appearance of the first and second image forming apparatuses.

13. The non-transitory computer-readable storage medium according to claim 1, where the images of the first and second image forming apparatuses are displayed on the same screen in parallel.

14. The non-transitory computer-readable storage medium according to claim 1, the control method further comprising, before acquiring the first sheet information, concurrently connecting the program to the first image forming apparatus and the second image forming apparatus wherein the second image forming apparatus is configured to be operated independent of the first image forming apparatus.

15. The non-transitory computer-readable storage medium according to claim 1, the control method further comprising causing the display device to further display the screen having an image of a sheet list having at least one of the first sheet information and the second sheet information such that at least one of the first sheet information and the second sheet information is displayed on the screen, the first sheet information is displayed in connection with the first sheet storage, and the second sheet information is displayed in connection with the second sheet storage,
- wherein the first and second sheet storages are sheet feeding trays and the program is one sheet management application that allows the user to use the one sheet management application to perform sheet management for the sheet feeding trays distributed among two or more image forming apparatuses by sharing sheet list information and setting information of the sheet feed trays that are stored as information unique to each of the two or more image forming apparatuses.

16. The non-transitory computer-readable storage medium according to claim 1, the control method further comprising performing setting of a sheet in a sheet feeding tray in accordance with an operation of the user received on the displayed screen, wherein, in response to receiving an operation from the user on the displayed screen, sheet information set in the first sheet storage of the first image forming apparatus is acquired and set in the second sheet storage of the second image forming apparatus.

17. An information processing apparatus comprising:
- an acquisition interface configured to acquire first sheet information registered in a first sheet storage of a first image forming apparatus and second sheet information registered in a second sheet storage of a second image forming apparatus; and
- a display device configured to display a screen having images of the first and second image forming apparatuses,
- wherein the display device is configured to display on the screen the image of the first image forming apparatus as an external appearance of the first image forming apparatus, and the image of the second image forming apparatus as an external appearance of the second image forming apparatus, and
- wherein, in a manner identifiable to a user, the display device is configured to display on the screen the first sheet information as superimposed on an image of the first sheet storage of the first image forming apparatus and the second sheet information as superimposed on an image of the second sheet storage of the second image forming apparatus.

18. The information processing apparatus according to claim 17, wherein the information processing apparatus is connected on an outside of the first image forming apparatus and the second image forming apparatus via a local area network.

19. A control method for controlling an information processing apparatus, the control method comprising:
- acquiring first sheet information registered in a first sheet storage of a first image forming
- apparatus and second sheet information registered in a second sheet storage of a second image forming apparatus; and
- causing a display device to display a screen having images of the first and second image forming apparatuses,
- wherein the image of the first image forming apparatus is displayed as an external appearance of the first image forming apparatus, and the image of the second image forming apparatus is displayed as an external appearance of the second image forming apparatus, and
- wherein, in a manner identifiable to a user, the first sheet information is displayed as superimposed on an image of the first sheet storage of the first image forming apparatus and the second sheet information is displayed as superimposed on an image of the second sheet storage of the second image forming apparatus.

\* \* \* \* \*